United States Patent [19]
Lipovski

[11] Patent Number: 5,623,423
[45] Date of Patent: Apr. 22, 1997

[54] APPARATUS AND METHOD FOR VIDEO DECODING

[75] Inventor: G. Jack Lipovski, Austin, Tex.

[73] Assignee: Univ. of Texas, Austin, Tex.

[21] Appl. No.: 354,380

[22] Filed: Dec. 12, 1994

[51] Int. Cl.$^6$ .................................................. G06F 17/00
[52] U.S. Cl. ......................................................... 364/514.12
[58] Field of Search .............................. 364/514 R, 725, 364/746, 715.02

[56] References Cited

U.S. PATENT DOCUMENTS

| | | | |
|---|---|---|---|
| 3,980,874 | 9/1976 | Vora | 364/715.02 |
| 4,418,394 | 11/1983 | Tai | 364/746 |
| 4,509,114 | 4/1985 | Leininger et al. | 364/DIG. 1 |
| 4,584,561 | 4/1986 | Bernardson | 340/347 DA |
| 4,709,345 | 11/1987 | Vu | 364/746 |
| 4,760,543 | 7/1988 | Ligtenberg et al. | 364/725 |
| 4,791,598 | 12/1988 | Liou et al. | 364/725 |
| 4,994,994 | 2/1991 | Burgess et al. | 364/746 |
| 5,008,668 | 4/1991 | Takayama et al. | 341/83 |
| 5,008,849 | 4/1991 | Burgess et al. | 364/746 |
| 5,107,345 | 4/1992 | Lee | 358/432 |
| 5,168,375 | 12/1992 | Reisch et al. | 358/432 |
| 5,311,547 | 5/1994 | Wei | 375/18 |
| 5,357,453 | 10/1994 | Kim et al. | 364/725 |

FOREIGN PATENT DOCUMENTS

| | | |
|---|---|---|
| 138078 | 4/1985 | European Pat. Off. |
| 514663 | 11/1992 | European Pat. Off. |
| WO94/21083 | 9/1994 | WIPO |

OTHER PUBLICATIONS

Baraniecka et al.; "On Decoding Techniques for Residue Number System Realization of Digital Signal Processing Hardware."; IEEE Transactions on Circuits and Systems Oct. 1978.

Jenkins; "Technique for Residue–to–Analog Conversion for Residue–Encoded Digital Filters."; IEEE Transactions on Circuits and Systems Jul. 1978.

Bliss, "Table Lookup Residue Adder," *IBM Technical Disclosure Bulletin*, pp. 1017–1018 (vol. 11, No. 8, Jan. 1969).

Tabak and Lipovski, "MOVE Architecture in Digital Controllers," *IEEE Transactions on Computers*, pp. 180–189 (vol. C–29, No. 2, Feb. 1980).

Guest et al., "Truth–Table Look–up Optical Processing Utilizing Binary and Residue Arithmetic," *Applied Optics*, pp. 1201–1207 (vol. 19, No. 7, Apr. 1, 1980).

Jullien, "Implementation of Multiplication, Modulo *a* Prime Number, with Applications to Number Theoretic Transforms," *IEEE Transactions on Computers*, pp. 899–905 (vol C–29, No. 10, Oct. 1980).

(List continued on next page.)

*Primary Examiner*—Ellis B. Ramirez
*Attorney, Agent, or Firm*—Louis J. Hoffman

[57] ABSTRACT

An MPEG-2 decoder circuit achieves smaller circuit area, and hence lower cost, by using circuitry, including ROMs, designed to implement residue arithmetic to calculate discrete cosine transforms in a pipelined or iterative fashion. A variable-length decoder based on ROM-like PLAs parses the stream of data to separate audio from video data and to direct the necessary operations on the data elements. The decoder and data flow through the system are controlled by a conditional MOVE processor, which is implemented as a data memory.

21 Claims, 8 Drawing Sheets

OTHER PUBLICATIONS

Taylor, "An Efficient Residue–To Decimal Converter," *IEEE Transactions on Circuits and Systems*, pp. 1164–1169 (vol. CAS–28, No. 12, Dec. 1981).

Waser et al., *Introduction to Arithmetic for Digital Systems Designers*, Chapter 2, "Residue Numbers and the Limits of Fast Arithmetic," pp. 53–76 (Holt Rinehart & Winston 1982).

Agrawal et al., "Modulo $[2^n +1]$ Arithmetic Logic," *IEEE J. on Electronic Circuits & Systems*, pp. 186–188 (vol. 2, Nov. 1978) (reprinted in Soderstrand et al., *Residue Number System Arithmetic: Applications in Digital Signal Processing*, pp. 123–125 (IEEE Press 1986)).

Loeffler et al., "Practical Fast 1–D DCT Algorithms with 11 Multiplications," *International Conference on Acoustics, Speech, and Signal Processing*, pp. 988–991 (1989).

*Coding of Moving Pictures and Associated Audio for Digital Storage Media at up to about 1.5 MBIT/S* (Draft ISO/IEC Committee 11172-3) (International Organization for Standardization and International Electrotechnical Commission, Joint Technical Committee 1/Subcommittee 29, Apr. 3, 1992).

Lipovski, *Object–oriented Interfacing to 16–bit Microcontrollers*, pp. 69–71 (Prentice Hall 1993).

*Information Technology—Generic Coding of Moving Pictures and Associated Audio Information—Part 1:Systems* (Draft International Standard ISO/IEC DIS 13818–1) (International Organization for Standardization and International Electrotechnical Commission 1994).

*Information Technology—Generic Coding of Moving Pictures and Associated Audio Information—Part 2: Video* (Draft International Standard ISO/IEC DIS 13818–2) (International Organization for Standardization and International Electrotechnical Commission 1994).

*Information Technology—Generic Coding of Moving Pictures and Associated Audio Information—Part 3: Audio* (Draft International Standard ISO/IEC DIS 13818–3) (International Organization for Standardization and International Electrotechnical Commission 1994).

Gadegast, "The MPEG–FAQ," pp. 1–102 (available on Compuserv as: D:\CSERVE\DOWNLOAD\MPEG3.TXT Aug. 2, 1994).

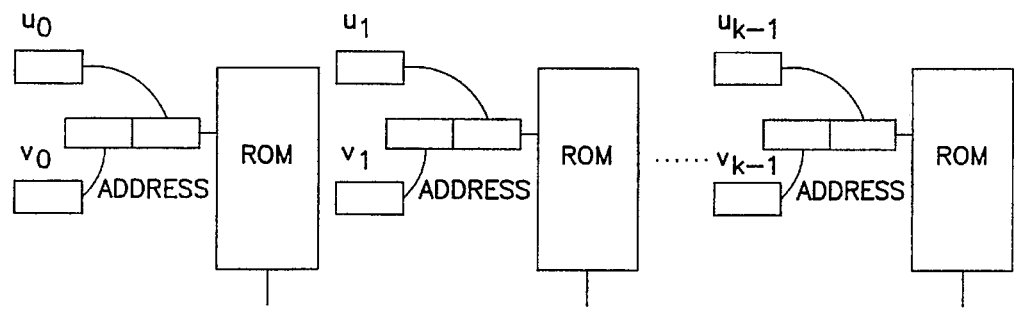
FIG. 8
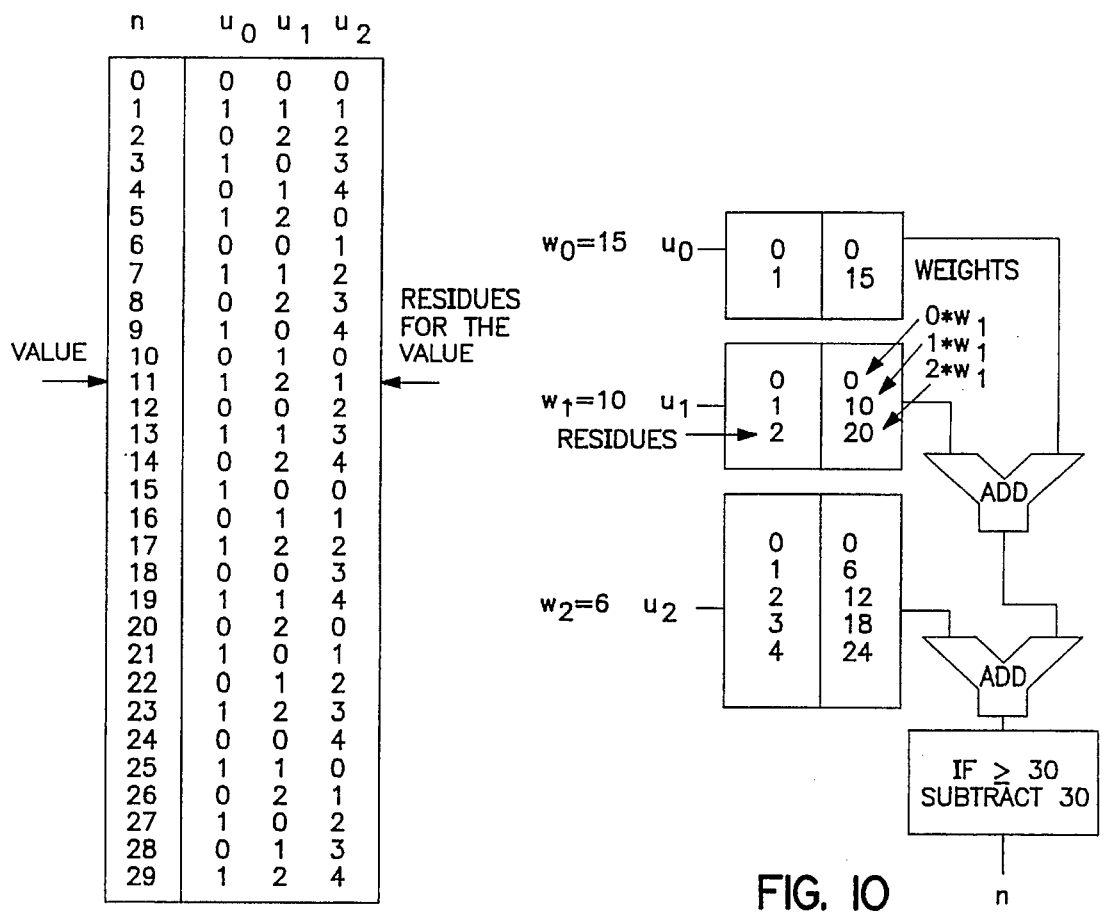
FIG. 9
FIG. 10

FIG. 13

| k \ i | 0 | 1 | 2 | 3 | 4 | 5 | 6 | 7 |
|---|---|---|---|---|---|---|---|---|
| 0 | 0.353553 | 0.353553 | 0.353553 | 0.353553 | 0.353553 | 0.353553 | 0.353553 | 0.353553 |
| 1 | 0.490393 | 0.415735 | 0.277785 | 0.097545 | -0.097545 | -0.277785 | -0.415735 | -0.490393 |
| 2 | 0.461940 | 0.191342 | -0.191342 | -0.461940 | -0.461940 | -0.191342 | 0.191342 | 0.461940 |
| 3 | 0.415735 | -0.097545 | -0.490393 | -0.277785 | 0.277785 | 0.490393 | 0.097545 | -0.415735 |
| 4 | 0.353553 | -0.353553 | -0.353553 | 0.353553 | 0.353553 | -0.353553 | -0.353553 | 0.353553 |
| 5 | 0.277785 | -0.490393 | 0.097545 | 0.415735 | -0.415735 | -0.097545 | 0.490393 | -0.277785 |
| 6 | 0.191342 | -0.461940 | 0.461940 | -0.191342 | -0.191342 | 0.461940 | -0.461940 | 0.191342 |
| 7 | 0.097545 | -0.277785 | 0.415735 | -0.490393 | 0.490393 | -0.415735 | 0.277785 | -0.097545 |

FIG. 14

| STAGE \ STEP | 1 | 2 | 3 | 4 | 5 | 6 | 7 |
|---|---|---|---|---|---|---|---|
| 0 | $y_{00}=c_{00}*x_{00}$ | $y_{20}=c_{02}*x_{00}$ | $y_{30}=c_{03}*x_{00}$ | $y_{40}=c_{04}*x_{00}$ | $y_{50}=c_{05}*x_{00}$ | $y_{60}=c_{06}*x_{00}$ | $y_{70}=c_{07}*x_{00}$ |
| 1 | $y_{10}=c_{01}*x_{00}$ | $y_{10}+=c_{11}*x_{10}$ | $y_{20}+=c_{12}*x_{10}$ | $y_{30}+=c_{13}*x_{10}$ | $y_{40}+=c_{14}*x_{10}$ | $y_{50}+=c_{15}*x_{10}$ | $y_{60}+=c_{16}*x_{10}$ |
| 2 | $y_{00}+=c_{10}*x_{10}$ | $y_{00}+=c_{20}*x_{20}$ | $y_{10}+=c_{21}*x_{20}$ | $y_{20}+=c_{22}*x_{20}$ | $y_{30}+=c_{23}*x_{20}$ | $y_{40}+=c_{24}*x_{20}$ | $y_{50}+=c_{25}*x_{20}$ |
| 3 | . | . | $y_{00}+=c_{30}*x_{30}$ | $y_{10}+=c_{31}*x_{30}$ | $y_{20}+=c_{32}*x_{30}$ | $y_{30}+=c_{33}*x_{30}$ | $y_{40}+=c_{34}*x_{30}$ |
| 4 | . | . | . | $y_{00}+=c_{40}*x_{40}$ | $y_{10}+=c_{41}*x_{40}$ | $y_{20}+=c_{42}*x_{40}$ | $y_{30}+=c_{43}*x_{40}$ |
| 5 | . | (EXECUTION OF PREVIOUS OPERATION) | . | . | $y_{00}+=c_{50}*x_{50}$ | $y_{10}+=c_{51}*x_{50}$ | $y_{20}+=c_{52}*x_{50}$ |
| 6 | . | . | . | . | . | $y_{00}+=c_{60}*x_{60}$ | $y_{10}+=c_{61}*x_{60}$ |
| 7 | . | . | . | . | . | . | $y_{00}+=c_{70}*x_{70}$ |

APPARATUS AND METHOD FOR VIDEO DECODING

BACKGROUND OF THE INVENTION

This invention is in the field of decoders for compressed video and audio signals.

Video compression is a technique used to send or store digitized video data more compactly, so that more "movies" can pass along the same communication channel or be stored in a particular storage medium.

The Motion Pictures Experts Group (MPEG) has defined International Organization for Standardization (ISO) standards for video and audio compression. MPEG-1 is a compression technique for compact disks, and is suited for hard disks. MPEG-2 is a similar compression technique for cable TV and for high definition TV (HDTV). However, MPEG-1 and -2 really define only the compressed bitstream as it is stored or sent, as a communications protocol.

The specific video protocols and specifications for MPEG-2 are defined in a three-part document published in 1994 by ISO and the International Electrotechnical Commission as a draft international standard, No. ISO/IEC DIS 13818-1, -2, and -3. Those documents are hereby incorporated by reference and referred to herein as "Part 1," "Part 2," and "Part 3, " respectively. The audio specification is defined in another ISO/IEC document, entitled "Coding of Moving Pictures and Associated Audio for Digital Storage Media at up to about 1.5 Mbit/s," produced by Joint Technical Committee 1, subcommittee 29 as Doc. No. 11172–3. That document is incorporated by reference and identified as the "Audio Standard."

Special cases of MPEG-1 and -2 specify the communication rates and screen sizes. One special case of MPEG-1, known by the acronym, SIF/CPB, narrows down the video's display dimensions to about half the width and height of a TV screen, and specifies a compressed data transmission rate of 1.5 Mbits/sec. A special case of MPEG-2, known as "main level," narrows down the video's display dimensions to about the width and height of a TV screen and specifies a compressed data transmission rate of 15 Mbits/sec. Finally, the acronym "SNR," which refers to the scalability profile, means that a low-bandwidth, highly reliable bitstream can be supplemented with a high-bandwidth, low-reliability bitstream. In this profile, with some exceptions, the receiver can display low-resolution pictures sent over the highly reliable bitstream and can display high-resolution pictures using both bitstreams.

A main-level, SNR profile, MPEG-2 decoder can also decode MPEG-1 SIF/CPB small-screen format, as well as simple and non-scalable profile, low- and main-level, MPEG-2 formats. MPEG-1 SIF/CPB is currently a rapidly emerging compression technique, as large numbers of CD-ROMs are being developed for personal computer multimedia systems. MPEG-2 is anticipated as being even more important commercially. Every cable set-top converter and every satellite dish is expected to use an MPEG-2 main-level decoder. HDTV is expected to use a "high" level, MPEG-2 compression technique, resulting in the need for an MPEG-2 "high" level, MPEG decoder in every HDTV set. No integrated circuit implementing high-level MPEG-2 has been announced at this time.

In view of the foregoing, there is a continuing desire in the art for an integrated circuit that can operate as an MPEG decoder more efficiently, in particular, a main-level, SNR profile, MPEG-2 decoder. Specifically, it is desired to achieve a decoder that can use less circuit area, and consequently achieve a lower manufacturing cost, than known implementations. As with any integrated circuit, the circuit area impacts the cost of the circuit dramatically.

The known technique most commonly used for discrete cosine transforms, the Loeffler method, is not well suited to either pipelining or a simple iterative loop because it does not perform identical operations on each element. It is not suited to residue arithmetic because it executes several adds before executing the multiply, increasing the precision, and thus the number of moduli, needed by the method. The Loeffler method is explained in an article by Loeffler et al., "Practical Fast 1-D DCT Algorithms with 11 Multiplications," printed at pages 988–91 of the 1989 publication resulting from the International Conference on Acoustics, Speech, and Signal Processing, which is hereby incorporated by reference.

It is an object of the invention, therefore, to create a circuit that can perform the video decoding and transforms necessary to implement the MPEG-2 standard without undue circuit sizes.

It is another object of the invention to create an MPEG-2 decoder circuit on a single integrated circuit.

It is another object of the invention to create a low-cost, main-level, SNR profile, MPEG-2 decoder.

It is another object of the invention to create a MPEG-2 decoder circuit that has a chip area, and hence a cost, that is reduced by about an order of magnitude over other, expected implementations of MPEG-2 decoders.

It is another object of the invention to create a circuit that can perform a discrete cosine transform on video data in an efficient manner.

It is another object of the invention to create a circuit that can perform variable-length decoding in an efficient manner.

It is another object of the invention to create a video decoder circuit that operates using residue arithmetic.

It is another object of the invention to create a variable-length decoder for video data streams that uses PLAs.

It is another object of the invention to create low-cost, efficient methods for operating on video data in accordance with the MPEG-2 specifications to perform variable-length decoding and discrete cosine transforms.

It is another object of the invention to implement an efficient residue-tobinary converter.

SUMMARY OF THE INVENTION

In any system meeting MPEG ISO standards, an encoder 102 (see FIG. 1) converts normal video 100 to compressed video and converts normal audio 101 to compressed audio. The combined and compressed signal is sent over a communication channel or stored in a storage medium, either of which is identified in FIG. 1 as numeral 103. Decoder 104 recovers normal video 105 from compressed video data and normal audio 106 from compressed audio data. The invention consists of a circuit that can operate on video signals as part of decoder 104.

The MPEG ISO standard largely specifies the organization of decoder 104. FIG. 2 shows a schematic diagram of an MPEG-2 decoder 104. First, the decoder inputs data from 103. If 103 is a communication channel, which may be noisy, the set of inputted data is called a transport stream, and if 103 is a storage medium, from which data may be read with greater reliability, the set of inputted data is called a program stream. The decoder parses the data (see 107) to convert the data from program or transport to elementary compression-level streams (as defined in §§2.4 and 2.5 of Part 1) and to perform certain other operations described below. The parsed data are stored in a fairly large input buffer 108. The buffer can store up to two elementary video streams, which are presented to a decoder 109 to generate one combined video output 105, and up to six elementary audio streams, which are presented to the decoder 109 to generate from one to six separate audio outputs 106.

Variable-length decoder (VLD) 109 converts fixed-length strings and variable-length, Huffman-coded bit strings in these elementary streams into data values for video requanfizer 110 and audio requantizer 115. Data sent to video requanfizer 110 eventually appears as video signal 105, and data sent to audio requanfizer 115 eventually appears as one of six audio signals 106.

In the video path, video requanfizer 110 requanfizes each data value by, first, multiplying it by two quantization step sizes and, next, copying it in zig-zag fashion into an 8×8 matrix. The result is called a "block." The block is discrete cosine transformed (see 111), to convert frequency-domain data to space-domain data. Next, the block is motion-compensation transformed (see 112) by, generally speaking, adding that block to a previously sent block that is stored in a large buffer 113. A buffer 118 holds a portion of the video data that is about to be displayed, to prevent individual block updates from being seen on the screen.

Meanwhile, each audio signal is parsed (109) requantized (see 115), discrete cosine transformed to convert to time domain, and windowed to smooth out the frequency response (see 116). A small buffer 117 holds the audio samples not being currently transformed.

Controller 114 sequences the transfer of data from VLD 109 through a token bus 399 to the other components and synchronizes the audio and video streams.

The inventive device achieves the above and other objects of the invention using the following implementations for the principal components: Compact ROM-like Programmable Logic Arrays (PLAs) are used to implement VLD 109. ROMs for table-lookup are used to implement the discrete cosine transform 111 in a pipelined fashion.

The inventive system uses simple, tableqookup ROMs by implementing the discrete cosine transforms using residue arithmetic, which is a highly specialized type of arithmetic that has been used in military signal-processing computers.

The combination of PLAs and residue arithmetic/ROM tableqookup results in an inventive circuit that achieves the principal objects of the invention. A main-level, SNR-scalable, MPEG-2 decoder in accordance with the invention can have a chip size that is smaller than even currently implemented MPEG-1 decoders by a large factor.

The mathematically best implementation of an n-point discrete cosine transform requires $n \cdot \log_2 n$ multiplication operations and an equal number of addition operations. The inventive implementation, using residue arithmetic, theoretically requires $n^2$ multiply-adds. Nevertheless, the inventive system can be implemented with an inner-product method that is convenient to pipeline or perform in an iterative loop, because the same operations are executed for each pipeline stage or loop execution. In addition, multiplication operations in the inventive residue arithmetic system can be simplified by noting that, in any pipeline stage, the only multiplication needed is multiplication by one of at most eight constants (fourteen constants for all stages combined).

Thus, while the larger number of mathematical operations would discourage most artisans from using the inventive system, it has been determined that the advantage of identical operations makes the inventive residue arithmetic/ROM table-lookup implementation of the decoder more attractive than known implementations using binary arithmetic.

One disadvantage of using residue numbers is that they have to be converted to and from binary numbers. However, the inventive system also incorporates an efficient residue-to-binary converter.

Contemporary MPEG-2 decoders equivalent to the inventive system are expected to take a chip area roughly comparable to a whole 16 Mbit DRAM. The inventive system disclosed here, by contrast, can be implemented on a single chip having only 148K ROM bits and 29K SRAM bits. The faster ROMs recommended in the invention will take an area somewhat larger than a conventional DRAM bit, say 1.5 to 3 times greater, and each SRAM bit will take an area of about four DRAM bits. Nevertheless, the inventive device disclosed here can be implemented in about 2 to 5% of the chip area of a 16 Mbit DRAM, which is smaller than the best known SIF/CPB MPEG-1 decoders. That is so even though a SIF/CPB video-only MPEG-1 decoder requires about a quarter of the processing power as the inventive MPEG-2 video decoder.

Thus, the inventive system allows for dramatic reduction in size, which translates into dramatic reduction in the cost of a very popular chip.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures, in which common numerals are intended to refer to common elements.

FIG. 8 is a diagram illustrating the organization of a residue number adder or multiplier.

FIG. 9 is a diagram illustrating the organization and function of a table-lookup converter, which converts unsigned residue numbers to or from binary numbers.

FIG. 10 is a simplified block diagram showing the structure of the converter of FIG. 9.

FIG. 13 lists the values of coefficients used in the video DCT of FIG. 12.

FIG. 14 illustrates the movement of partial results through the pipeline of FIG. 12.

DETAILED DESCRIPTION OF THE PREFERRED EMBODIMENT

Figure 5:
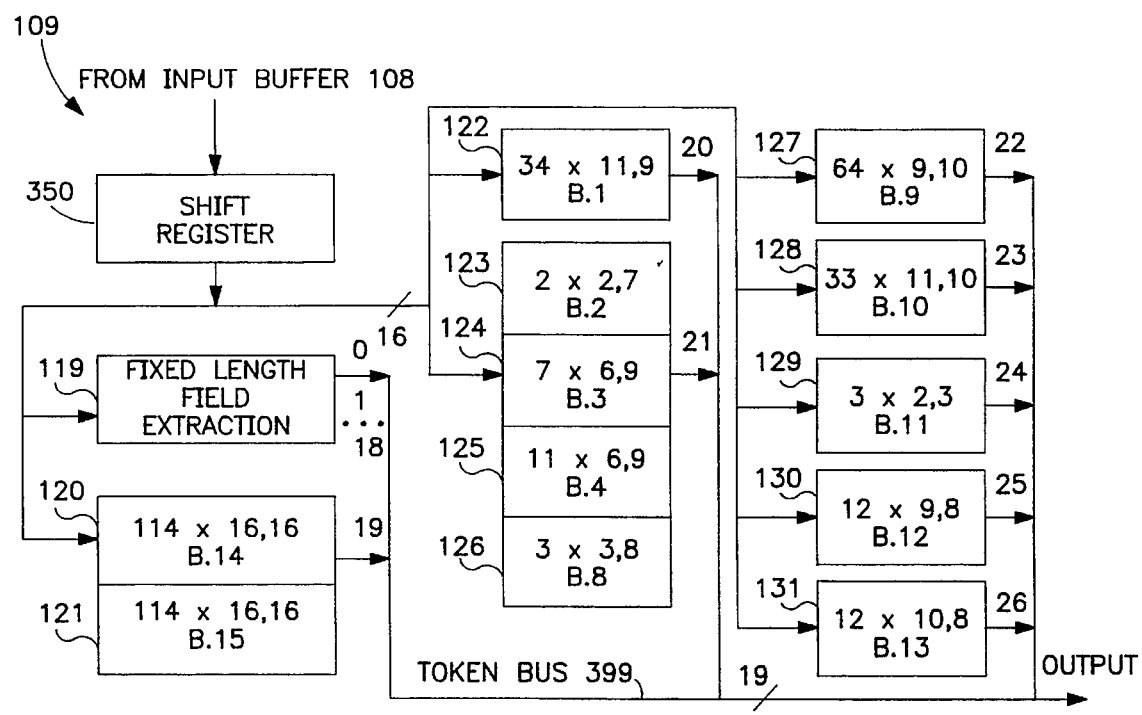
FIG. 5 is a block diagram showing a preferred implementation of the VLD for the inventive MPEG-2 decoder.

The encoded data reaching the inventive version of the MPEG-2 decoder circuit 104 (see FIG. 2) first passes parser 107, which separates out video, audio, and system data. The video-decoding portion of the circuit is composed of three primary portions:

First, there is a variable-length decoder (VLD), which extracts data from the video or audio stream being parsed and passes them to the video or audio processing circuitry, as appropriate. FIG. 5 is a block diagram of the inventive MPEG-2 VLD. Section 1, below, describes the VLD. The VLD passes the parsed sections of data to an appropriate destination on an 19-bit token bus 399 (see FIGS. 2 and 5), where the data are transferred to different control registers or to a requantizer, which is described below.

Second, there is discrete cosine transform module (DCT), which is shown in detail in FIGS. 11 and 12 and described in Section 4, below. The DCT receives from the VLD video data representing an 8×8 block of pixels, where each value is a frequency-domain component of the signal. The DCT operates to transform the input data to space-domain, so that it may be displayed. In the inventive system, the DCT implements residue arithmetic, which is described in general in Section 2, below. The application of residue arithmetic to the DCT design is described in Section 3, below, including the circuitry needed to convert binary numbers to and from residue numbers.

The inventive device can use known techniques to implement MCT 112. System components in 107 and in 114 (which controls passing of data among 109, 110, 115, and 138) can be achieved using two conditional MOVE processor, as described in FIG. 15 and Section 5, below.

Third, there is a motion compensation transform processor (MCT), which reconstructs the DCT-transformed video data into screen displays. The main way in which MPEG compresses video data is by performing motion compensation, in which one display is expressed in the form of differences from a previous display. The MCT decodes those expressions. Any MCT can be implemented with the inventive system.

1. The VLD and Requantizer

Figure 3:
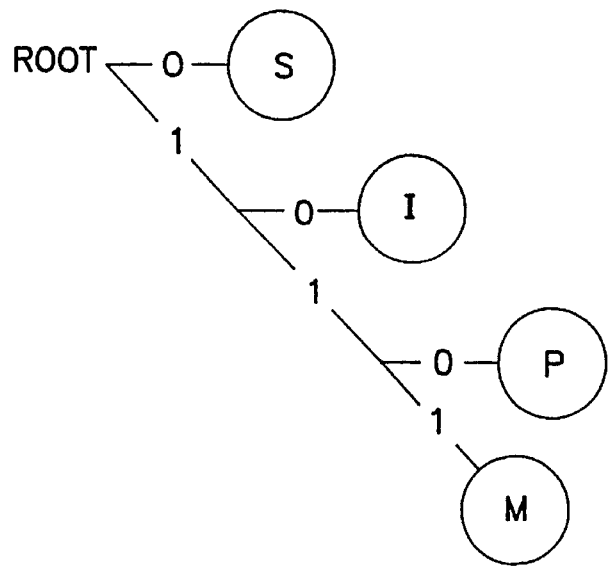
FIG. 3 is a graph of a variable-length decoder (VLD) tree.

In the first processing step, the VLD decodes Morse code-like "variable-length run-length codes." A simplified VLD can implement a character string decoder, as described in more detail at pages 69–71 of my textbook entitled, "Object-oriented Interfacing to 16-bit Microcontrollers" (Prentice Hall 1993), which is hereby incorporated by reference. A variable-length code is defined by a binary tree (FIG. 3). The letters at each leaf of the tree are represented by the pattern of 1s and 0s leading from the root of the tree along the branches to the leaf. To encode a character string, replace each letter with the string of bits that passed along the path from the root to the leaf representing that letter. For example, using the tree of FIG. 3, the character string MISSISSIPPI can be represented by the bit string 111100010001011011010 ('111' for the 'M', '10' for the 'I', '0' for the 'S', etc.). To decode the bit string, start at the root of the tree and use each successive bit of the bit string to move up (if 0) or down (if 1) the next branch until reaching a leaf. Then, the letter associated with that leaf is recorded and the process is repeated, beginning at the root of the tree and with the next bit of the bit string.

Figure 4:
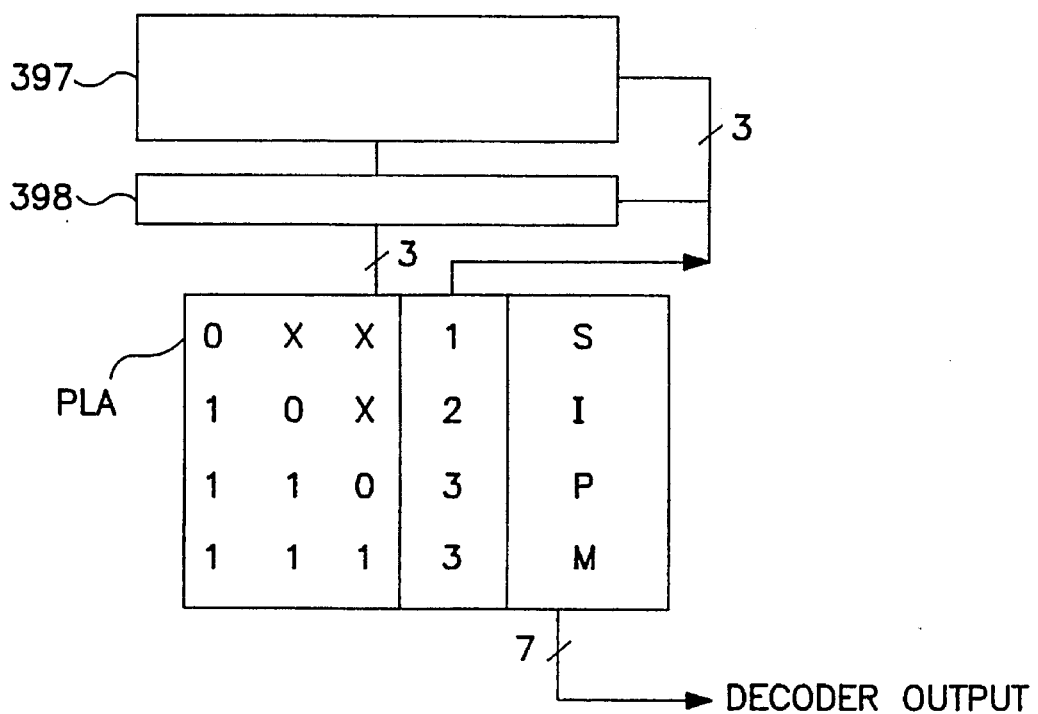
FIG. 4 is a diagram showing an example functional diagram of a VLD for the tree of FIG. 3.

VLD input data are first extracted from the input file/packet and then stored in an input queue until needed by the VLD. FIG. 4 illustrates an implementation of the VLD using a Programmable Logic Array (PLA), which is in effect an associative read-only memory. Input data are held in the input queue 397, and leading bits are held in a shift register 398. The register's contents are compared with each PLA row. For instance if the register contains 110 . . . , the third row of the PLA shown in FIG. 4 matches the contents of the register, and the VLD outputs a '3' and a 'P'. The output '3' causes shift register 398 to shift the register data three bits left and bring in three new bits from input queue 397. The output 'P' is the decoded result.

Note that the 'x' characters in FIG. 4 represent "don't care" bits, which are always to the right of the code. Thus, one could implement the PLA by designing a ROM and removing duplicated rows and decoder gate inputs. For instance, the PLA of FIG. 4 could be implemented in a ROM with eight rows, in which the first four rows contained the output pair (1,S). Three of those four rows could be eliminated, and the decoder gate that enables the rows would be then simplified by removing its two least significant bit inputs. The next two rows of the original ROM would have identical output pairs, (2,I), so one row could be eliminated and its decoder gate simplified by removing its least significant bit input.

By analogy to FIG. 4, the MPEG VLD receives input bit strings from an input buffer, parses the strings to separate them into video, audio, and system data, and performs certain preliminary operations on the parsed data, as necessary. Buffer 108 shown in FIG. 2 acts as the input buffer, analogous to input queue 397 in FIG. 4.

A main-level MPEG-2 decoder with SNR scalability requires a 1.835 Mbit input buffer, and data arrive into it at 15 Mbits/sec. on the less-reliable channel and 10 Mbits/sec. on the more-reliable channel. (See §8.3.3.2 of Part 2)

FIG. 5 is a block diagram of the MPEG-2 VLD. Shift register 350 is analogous to shift register 398 in FIG. 4.

The basic unit of MPEG-2 video data is a "block," which consists of data for a group of 8×8 pixels. In the terminology of MPEG, four contiguous blocks make up a "macroblock," which are therefore 16×16 pixels in size. A sequence of macroblocks extending across the screen is called a "slice," which is therefore comprised of data regarding 16 consecutive scan lines. "Picture data" consists of a sequence of slices. Picture data and slices may contain data for contiguous scan lines, describing a "frame," or for alternate (even or odd) scan lines, describing a "field." A frame, or two fields, is equivalent to a T.V. screen. Each frame therefore consists of an array of 90×60 blocks. Picture data are stored or transmitted with various header and other associated data, which are described in the MPEG-2 specification.

Figure 6:
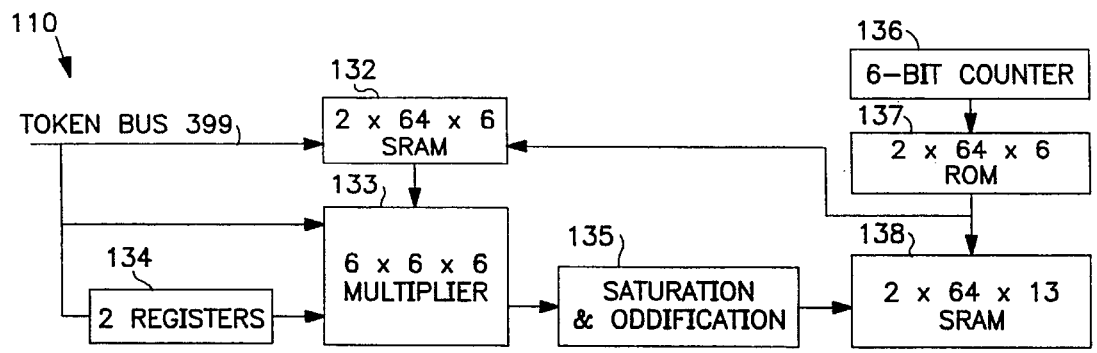
FIG. 6 is a block diagram showing a preferred implementation of an MPEG-2 video requantizer.

The discrete cosine transform operates on a single block, as so defined. Blocks are sent to the DCT (shown in FIG. 12) via an inverse quantizer (requantizer), which is shown in FIG. 6.

VLD 109 of FIG. 5 must parse the input string for the macroblock address increment (Table B1), macroblock type (Tables B2 to B4 and B8), block pattern (Table B9), motion vector (Table B10), and dc coefficients (Tables B12 to B15). (All references to "Tables" in the preceding sentence refer to Annex B of Part 2, which specify the requirements that the ordinarily skilled artisan may use to fill in the detailed contents of the PLAs of the inventive system.) In addition, VLD 109 must parse the input string for certain fixed-length fields, specifically bit fields that may have lengths of 1 to 8, 10, 12, 14, 15, 16, 18, 25, 32, and 512 bits. (See §6.2 of Part 2 and Tables 6.2.2 to 6.2.6.)

Under the direction of controller 114, VLD 109 pulls data from input queue buffer 108 through a 19-bit-wide token bus 399, where the data are transferred to different control registers or to video requantizer 110 or audio requantizer 115. The control system operates to implement the parsing rules described in §6 of Part 2. Controller 114 is further described in FIG. 15, below. As explained in Section 5, below, controller 114 has a program memory such as 414 in FIG. 15, which operates as a program that outputs a from-address and a to-address. Those addresses are used to control the source and destination of data moving along bus 399.

For purposes of this description, data extracted from the input data stream and located in control registers are called "stream variables." An example of a stream variable is the 5-bit value that acts as a quantization step multiplier stored in block 134 in FIG. 6, discussed below. Other stream variables appear in controller 114 and control all parts of the decoder.

Token bus 399 operates to connect a source address (shown as a number next to the token bus in FIG. 5) and a destination address that identifies the register or module to receive the data. The source address refers to one of several PLAs (1) that determine how much data are taken from the input queue through control of shift register 350; and (2) that may perform certain transformations on the data from the input queue. The destination address determined where the data are put. Thus, in any microcycle, a word is transferred from the selected source to the selected destination.

The following discussion focuses on how the source address is used to determine how data are taken from the input queue. There is a mechanism for taking a fixed number of bits from the input queue, which is discussed first, and another mechanism for removing a variable number of bits from the input queue, depending on the coding of the first bits that are taken from the input queue, in a manner analogous to the mechanism shown in FIG. 4. This variable-length encoding system uses PLAs and is discussed afterwards.

If the next field is a fixed-length field, the controller 114 issues a command having a source address equal to the number of bits in the field. Module 119 then operates to extracts the fixed-length field as follows: If the source address is a value (referred to with the variable "i") between 0 and 18, then the left-most 18 bits of the input buffer's data are placed on the token bus, in left-justified format, and the input buffer data are shifted left i bits. The left-most i bits are transferred along token bus 399 to an i-bit destination register, specified by the destination address, and the remaining bits are ignored. Because the input buffer data are shifted left only i bits, as opposed to the full 18 bits, the bits that are transferred but discarded remain in the input buffer for the next operation.

The source address 0 is used to test the first bits in the input queue without removing them.

An extra sign bit, a nineteenth bit, is used only for transfers of data to video requantizer 110 from DCT coefficient decoder 120 or 121.

If it is desired to transfer a field having a width greater than 18, the field can be transferred by multiple operations: For example, a 25-bit field is transferred by reading location 18, which causes transfer of 18 bits, and then reading location 7, which causes transfer of the remaining 7 bits.

For instance, the sixth row of table 6.2.5 of Part 2, which states "quantiser_scale_code . . . 15 uimsbf", directs the skilled artisan to write the controller's microprogram to transfer the five most significant bits ("uimsbf" means "unsigned integer, most significant bits first") to quantization step multiplier block 134. Thus, in that example, the source address is "5" and the destination address is that for the 5-bit register in block 134.

Module 119, the fixed-length decoder, can be implemented with simple tristate bus drivers or multiplexers that transfer data from buffer 108 to token bus 399.

Variable-length data are read from input buffer 108 by applying source addresses greater than 18, which access decoder PLAs 120 through 131 of FIG. 5 in a manner similar to the technique described above in connection with FIG. 4.

If the source address is 20, as indicated next to block 122 in FIG. 5, then PLA 122, which encodes the macroblock address increment 122, will be accessed. The notation "34× 11,9" inside block 122 of FIG. 5 denotes that PLA 122 consists of a 34-row PLA with an 11-bit compare width and 9-bit data output column. In the 9-bit data output column, 4 bits of the output controls the shifting of the input data and the remaining 5 bits stores the macroblock address increment. The notation "B.1" inside block 122 refers to Table B.1 of Annex B of Part 2, which specifies the contents of this PLA. When the source address is 20, PLA 122 transfers its "macroblock address increment," in right-justified format, through the token bus to the MCT module's controller, where it is added to the macroblock number that the MCT is updating. PLA 122 also controls shifting of the input buffer data.

PLAs 127 to 131, at source addresses 22 to 26, implement Tables B.9 to B.13, and are configured and work essentially the same as PLA 122. PLA 127 encodes the coded block pattern, PLA 128 encodes the motion code, PLA 129 encodes the Dm vector, PLA 130 encodes the DC size for luminance, and PLA 130 encodes the DC size for chrominance. The PLA sizes, data widths, and references to the MPEG specification documents are specified in FIG. 5 using the same notation as described above. FIG. 5 also specifies the width of token bus 399 at various points.

At address 19, one of two DCT coefficient tables 120 or 121 is selected by a stream variable. PLAs 120 and 121 transform data from the input buffer encoded as variable-length codes into numeric values. The variable-length codes are specified in Tables B.14 and B.15 of Part 2. After the transformation, the PLAs output 13 bits on token bus 399. The left-most 6 bits represent a run (the number of 0's), the next 6 bits represent a numeric level (which will be transformed into a pixel intensity), and the last, right-most bit represents the sign of that level. Data from PLAs 120 or 121 are generally sent to requantizer 110. The run length used in conjunction with counter 136 of requantizer 110 to control the number of zeros, and the value is sent to multiplier 133, which elements are described in more detail below, in connection with FIG. 6.

At address 21, one of four macroblock type tables 123 to 126 is selected by a stream variable. The six bits output on the token bus are put in a register of controller 114, for reasons described in Section 5, below, becoming other stream variables. Those variable are used later in other parts of the decoder, based on the programming of controller 114.

In addition, controller 114 also compares the input data to a start code or header consisting of fifteen zeros followed by a one and an eight-bit value. If the start code is detected, the controller is redirected to generate a sequence of commands determined by the eight-bit value, i.e., to begin a new procedure on the following data, and the start code or header pattern is dropped, i.e., shifted out of the shift register. The comparison is further described in Section 5, below.

Also, an "end-of-block" read from location 19 redirects controller 114 to terminate a procedure that repetitively reads DCT coefficients to the requantizer, to force the controller to begin searching for the next header, as described in the previous paragraph. The requantized coefficients become the array of "x" values that are transformed to spacial coordinates by DCT 111, as described in Section 4, below.

Finally, an "escape" pattern of 000001 read from location 19 causes the next 18 bits after the escape pattern to be put on the token bus, and the escape pattern and the following 18 bits are dropped.

Destination addresses are defined for the below-described registers of video requantizer 110, for audio requantizer 115, and for certain registers of controller 114, as described in Section 5, below.

Together, the PLAs of FIG. 5 contain 5,316 compare bits and 5,325 output bits. Alternatively, it is possible to combine the various PLAs into a single PLA by using the source address as the most significant bits of the single PLA variable-length decoder.

The inventive, PLA-based VLD is not only area-efficient but also facilitates implementation of the MPEG-2 SNR profile. The SNR profile requires reading two video input streams and combining them after requantization, before the discrete cosine transform. The conventional technique of implementing variable-length decoding comprises traversing a linked-list structure that describes a tree (FIG. 3). That technique will take about an order of magnitude more time than the PLA-based decoder shown in FIG. 5. The extra speed makes it easier to decode the two video input streams of the SNR profile specification.

Requantizer 110 is shown in FIG. 6. That component uses conventional binary arithmetic, because the range of input values sent to it requires only six bits (with a sign). Although conventional binary arithmetic is used in this embodiment, an alternative embodiment can use residue arithmetic to perform the multiplication operation required therein.

The function of requantizer 110 is to decompress the data stored or transmitted on channel 103 (FIG. 1) as 6-bit values with an extra sign bit, and received from VLD 109, specifically from PLAs 120 or 121 (see FIG. 5), which values represent lower-precision expressions of frequencies. The output of requantizer 110 are 12-bit numbers with an extra sign bit, which represent frequency data describing the harmonics of each row and column of a block, which are transformed by the discrete cosine transform to spatially related data. As seen in FIG. 6, multiplier 133 of requantizer 110, which is implemented as a string of carry-save adders, accomplishes that function by multiplying the VLD data by two numbers, one of which is from a register in block 134 and the other of which comes from an SRAM 132. Those numbers represent two quantization step sizes/defined in sections 7.4 and 7.4.2.1 of Part 2.

Each time VLD 109 decodes a macroblock, block 134 is loaded with the first quantization step size, which is associated with the particular type of macroblock being decoded and used throughout the entire macroblock. Block 134 contains two registers, one that stores a 5-bit value (stream variable) and the other that stores a one-bit value (stream variable). If the one-bit value is "1," then the 5-bit field is shifted to the left, which doubles its value. The one-bit value is loaded when a picture extension is sent in the bitstream, and the 5-bit value is loaded when VLD 109 decodes a macroblock. The resulting 6-bit value represents the first quantization step size, which is combined with the data from PLAs 120 or 121 of VLD 109 in multiplier 133 of requantizer 110.

The second quantization step size sent to multiplier 133 comes from SRAM 132. SRAM 132 contains two complete sets of multipliers, each of which set is an 8×8 array of 6-bit numbers. One of the numbers is selected from SRAM 132 and used as the second, 6-bit quantization step size. A stream variable defining the type of macroblock selects which of the two 8×8 sets of numbers will be used, and the system automatically selects for use the 6-bit number within the selected array that matches the location of the matrix element being written.

Figure 7:
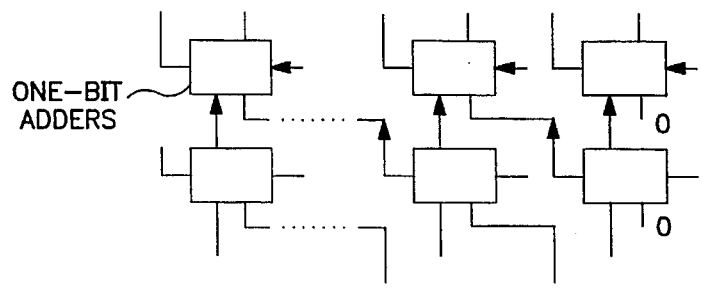
FIG. 7 is a functional diagram illustrating the structure of the multiplier used in the video requantizer of FIG. 6.

FIG. 7 illustrates the carry-save interconnections of the adders used to make up multiplier 133. Each 6-bit adder, represented by a row of one-bit adders, sends its sum to the one-bit adder above it and its carry to the one-bit adder to its left, resulting in an output at the top. The arrangement shown produces a multiplier 133 that operates using a sequence of adding and shifting operations.

Block 135 contains circuitry to "saturate" this product at ~±256. In other words, if the product is greater than 255, it is made to equal 255, or if the product is less than −256, it is made to equal −256. Block 135 also makes the sum of all the coefficients have odd parity by adjusting the least significant bit of the last (7,7) coefficient.

Figure 1:
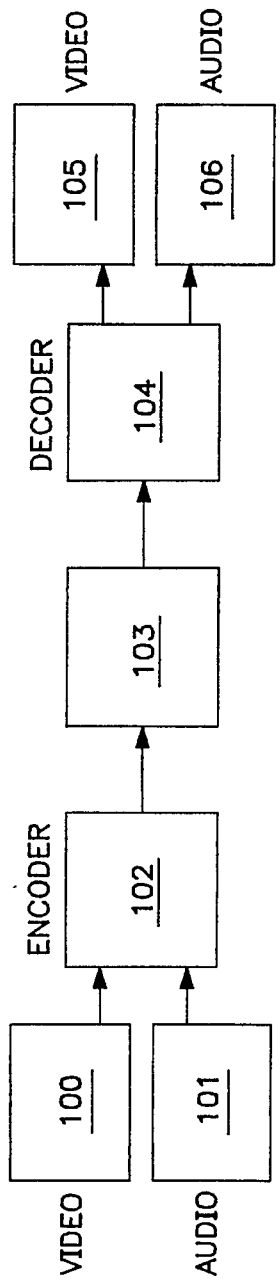
FIG. 1 is a description of the overall signal paths used in the encoding and decoding of compressed video and audio data.

The sequence of DCT coefficients is placed in SRAM 138, in either a zig-zag or an alternate pattern of locations, which is chosen by some stream variable bits associated with the macroblock header. The two patterns are shown in FIGS. 7-1 and 7-2 of Part 2, respectively.

Figure 2:
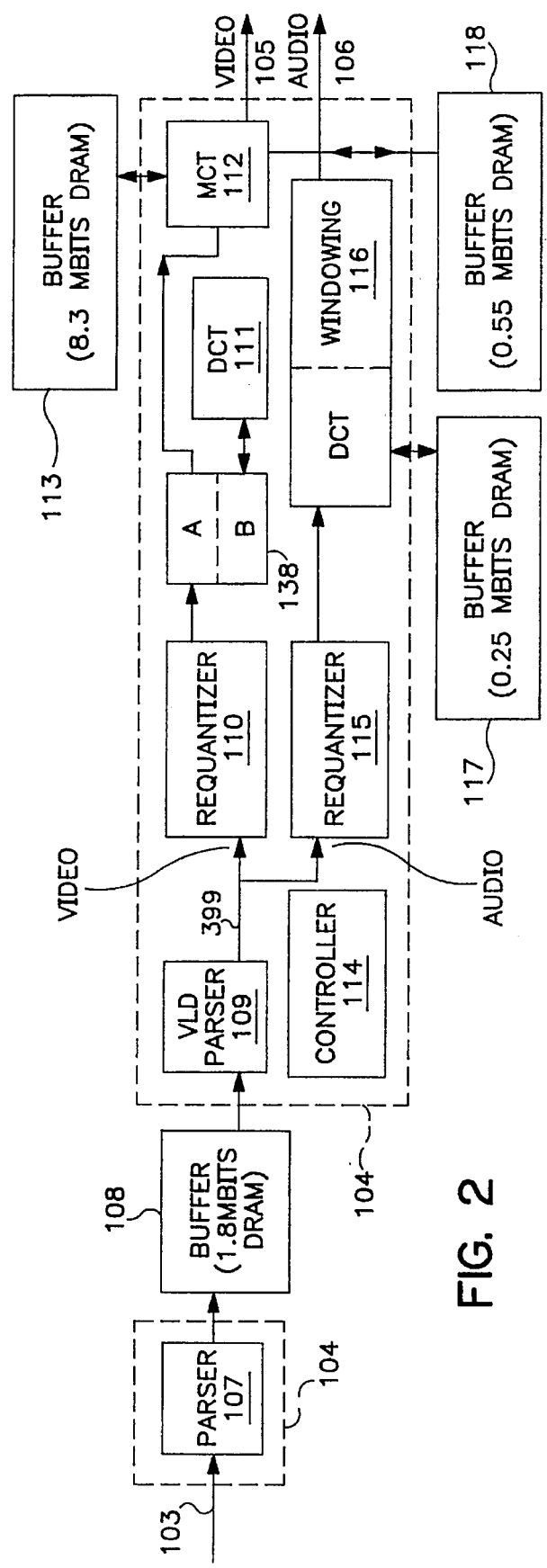
FIG. 2 is a block diagram of an MPEG-2 decoder.

A 6-bit counter 136 generates the storage location addresses through a small ROM 137, and these are used to select quantization steps in SRAM 132 for requantization and to place the requantized coefficients in SRAM 138, which (as seen in FIG. 2 and described below) is an interface among requantizer 110, DCT 111, and MCT 112.

2. Residue Arithmetic

As described below, residue or modulus arithmetic (see reference [5]) significantly reduces the size of the DCT, compared to using binary arithmetic. This section provides some background in residue arithmetic. Further details of residue arithmetic is provided in Chapter 2, "Residue Numbers and the Limits of Fast Arithmetic," which is at pages 53–76 of the textbook by Waser et al. entitled "Introduction to Arithmetic for Digital Systems Designers" (Holt Rinehart & Winston 1982), which is hereby incorporated by reference.

Residue arithmetic is defined by a set of k relatively prime moduli $(m_0, m_1, \ldots, m_{k-1})$. An integer n in residue arithmetic is represented as a k-tuple $(v_0, v_1, \ldots v_{k-1})$ where each member of the k-tuple $(v_i)$ is the remainder of the integer (n) divided by the associated modulus $(m_i)$.

In the commonly used computer programming language called "C," the remainder of n divided by m, using integer division, is denoted as n÷m. For example, 4÷2 is the remainder after dividing 4 by 2, which is 0. In this description, the C-language terminology will be followed.

For the following illustration of residue arithmetic, assume the use of the moduli 2,3,5. In that example, the ordinary number 4 is represented as (0,1,4), calculated by $4 \div 2$, $4 \div 3$, $4 \div 5$, and the number 6 is $6 \div 2$, $6 \div 3$, $6 \div 5$, or (0,0,1). Moduli must be relatively prime.

For unsigned numbers, any number less than the product of all of the moduli can be uniquely represented in the moduli number system, and for signed numbers, any number between $M/2-1$ and $-M/2$ can be represented, by representing negative numbers n as $M+n$.

In residue arithmetic, addition and multiplication are performed on each element separately, without carries or shifts between elements. In general, if the number n is represented by $(u_0, u_1, \ldots u_{k-1})$ and the number m is represented by $(v_0, v_1, \ldots v_{k-1})$ then the sum n plus m is calculated as $((v_0+u_0) \div m_0, (v_1+u_1) \div m_1, \ldots, (v_{k-1}+u_{k-1}) \div m_{k-1})$. For instance, in the example above, recall that 4 is (0,1,4) and 6 is (0,0,1). Thus, 4 plus 6 will be $((0+0) \div 2, (1+0) \div 3, (4+1) \div 5)$ or (0,1,0). Note that 10 is $(10 \div 2, 10 \div 3, 10 \div 5)$, or (0,1,0), too.

Products are similarly simple. The generalized product $n \cdot m$ is $((v_0 \cdot u_0) \div m_0, (v_1 \cdot u_1) \div m_1, \ldots, (v_{k-1} \cdot u_{k-1}) \div m_{k-1})$. For instance, 4 times 6 is calculated by $((0 \cdot 0) \div 2, (1 \cdot 0) \div 3, (4 \cdot 1) \div 5)$ or (0,0,4). Note that 24 (the product of 4 and 6) is $(24 \div 2, 24 \div 3, 24 \div 5)$, which is also (0,0,4).

Using the assumed set of moduli, if the numbers are unsigned, any number less than $2 \cdot 3 \cdot 5 = 30$ may be represented, and if signed, then numbers from $-15$ to $+14$ can be represented.

An advantage of residue arithmetic is that, with the use of small moduli $m_k$, addition and multiplication can be implemented using small-sized ROMs. FIG. 8 shows an arrangement of elements, which clarifies that an adder/multiplier can be implemented with k modules containing two registers and a small ROM. To add $n+m$, using the general terminology above, in the left subsystem of FIG. 8 we concatenate $u_0$ and $v_0$ to create an address a and read out the ath row of the left ROM. This ROM has been written such that its ath row contains the number $(v_0+u_0) \div m_0$. The operation is repeated for $(u_1,v_1)$ through $(u_{k-1}, v_{k-1})$, for each of the other ROMs, which operations can proceed in parallel.

Multiplication is implemented similarly, using k ROMs filled with data such that the ath row of the ith ROM contains $(v_{i-1} \cdot u_{k-1}) \div m_{i-1}$. Note that the left-most subsystem's ROM has $m_0$-squared rows and $[\log_2 m_0]$ bits in each row, the next left-most subsystem's ROM has $m_1$-squared rows and $[\log_2 m_1]$ bits in each row, and so on (where the expression "[xyz]" refers to the next highest integer above the expression xyz). For the case of residue arithmetic using 2,3,5 moduli, the left-most ROM has four rows of one bit, the middle ROM has nine rows of two bits, and the right ROM has 25 rows of three bits.

Note that addition does not need carry propagation and multiplication does not need shifting. Both operations execute completely in a single ROM access time. That represents a significant advantage of using residue arithmetic.

For multiplication of a constant times a variable, only part of the table, the part associated with the constant, need be stored for one of the multipliers. That is, for the 2,3,5 moduli, rather than the above-sized tables, it is possible to implement the desired circuit in three ROMs, one having two rows of one bit, a second having three rows of two bits, and a third having five rows of three bits.

In general, where there are h constants, then the ROMs need have only one entry designating which constant is to be used and another entry designating the number to be multiplied by the constant. The ith subsystem's ROM would have $h \cdot m_i$ rows and $[\log_2 m_i]$ bits per row. For instance, if there are three constants, in the 2,3,5 modulus number system, the multiplication table would be implemented in three ROMs having sizes 6×1, 9×2, and 15×3. The hardware for multiplication by a constant is then essentially the same as that for an adder or multiplier (FIG. 8) except that there would be $h \times m_i$ rows rather than $m \times m_i$ rows.

Residue number arithmetic also requires conversion to and from the conventional binary number system. Conversion from binary to residue may be simply executed with a table-lookup using a ROM, as shown in FIG. 9. The binary number value provides the row address, and the cells across the row store the residues.

Conversion from residue to binary is done with an adder pipeline. (See the Waser textbook.) If the number n is expressed in residue form as $(u_0, u_1, \ldots, u_{k-1})$, the binary number representation of n is obtained by evaluating the expression:

$$n = (\Sigma_{i=0}^{k-1} w_i \cdot u_i) \div M,$$

where (i) the multiplication, addition, and modulus operations are executed in regular binary arithmetic, (ii) $w_i$ are a series of weights, and (iii) where M is the product of all of the moduli $(m_0, m_1, \ldots m_{k-1})$. Each weight $w_i$ (associated with modulus $m_i$) is calculated by looking for the integral multiple of $(M/m_i)$ that is represented as a residue number that has all "0"s except a single "1" in the ith place from the left. An algorithmic expression of determining the weight $w_i$ for a particular modulus $m_i$ is as follows: (i) Let the variable j increment in unit steps, that is, 1, 2, 3, ..., $m_i-1$; (ii) for each step, compute the expression $J=((j \cdot (M/m_i)) \div M)$; (iii) convert the result to residue form; (iv) examine the residue form to see if it has all zeros and a one in the ith place; and (v) if so, then J is the weight $w_i$ and the process can be terminated. The weights can be calculated in advance for a particular set of moduli, which is sufficient for hardware implementations of a residue-to-binary converter.

The hardware for conversion from residue to binary, shown in FIG. 10, uses a ROM having $m_k$ rows to multiply $w_i \cdot u_i$ in binary, by storing $(w_i \cdot u_i) \div M$ in the ROM's ith row, and $k-1$ binary adders to compute the above-described sum (V). The final value $V \div M$ is computed in a pipeline implementing the following iterative formula: For $r=[\log_2(h-1)]$, ..., 0: if $V>(M \cdot 2^r)$, subtract $(M \cdot 2^r)$ from V.

3. Application of Residue-Number System to the MPEG-2 DCT

Residue arithmetic is not useful if the algorithm requires division or comparison. It is only useful for addition, subtraction, and multiplication. The MPEG-2 DCT, however, uses only addition and multiplication.

Residue arithmetic multiplication uses integral, rather than fractional multiplication, and residue numbers are hard to scale. Thus, the value of M (as defined above) must be larger than the range of the largest possible integer result.

In the following discussion, assume that the inputs and outputs of the DCT are 12-bit signed values. If more bits of accuracy are needed the design can be modified in a straightforward way by adding elements to the moduli or selecting different moduli. In the DCT, the input falls between $-2048$ and 2047 and coefficients are 12-bits, as defined by the specification. Multiplying a 12-bit by a 12-bit number produces a 24-bit result, and adding eight of these results in a 27-bit value R that cannot be greater than 134,217,728. It is necessary to select a set of relatively prime moduli that have a product greater than that number.

On the other hand, it is preferred to select moduli that are as small a possible, so that the adders (such as 213 in FIG. 12) and the multipliers (such as 205 in FIG. 12) such as can contain ROMs that are as small as possible, to conserve space. In the inventive circuit, moduli 5, 7, 9, 11, 13, 16, 17, and 19 have been selected. That set of moduli has a product M that is 232,792,560, which is greater than R, yet no modulus is particularly large. The selected moduli are small prime numbers (5, 7, 11, 13, 17, 19) or powers of small, unused prime numbers (9, 16).

Figure 11:
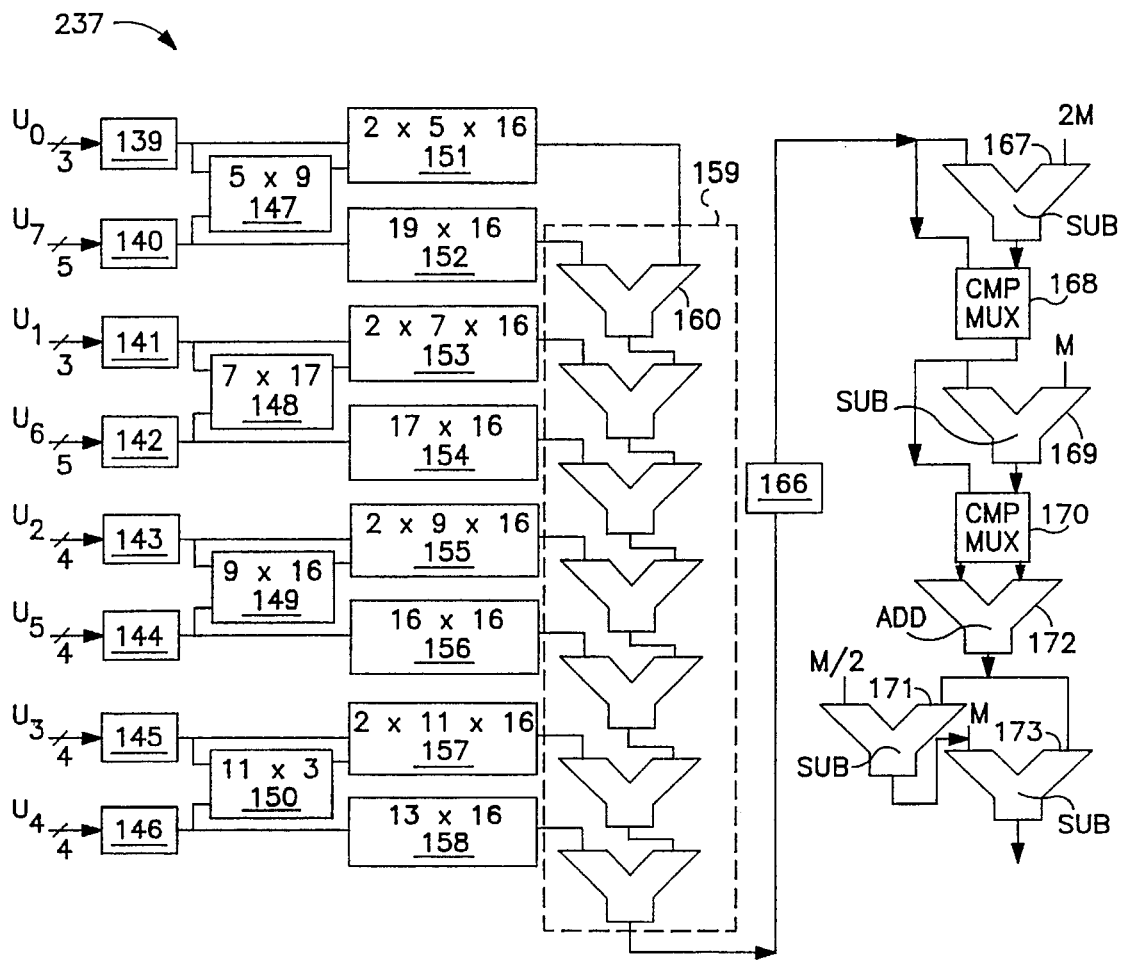
FIG. 11 is a block diagram of a preferred embodiment of the residue-to-binary converter of the MPEG-2 circuit, in accordance with the theory of FIGS. 9 and 10.

FIG. 11 shows a residue-to-binary converter 237 for the DCT using the selected moduli. A residue number using that set of moduli will have 32 bits. A 32-bit residue number flows into converter 237 through registers 139–146, with the residue elements ($u_0$ to $u_7$) arranged as specified at the left edge of FIG. 11. Each of those registers are as wide as its modulus requires, namely 3, 4, or 5 bits wide.

Each modulus is converted to binary by ROMs 151–158. Half of ROM 151 performs the multiplication function shown in FIG. 10, in that is has ($w_i \cdot u_i$)÷M stored the ROM's ith row.

The outputs are combined in an adder pipeline 159, which consists of seven carry-save adders, as shown in FIG. 11. The top adder 160 in pipeline 159 operates on the modulus 5 and modulus 19 elements, that is, $u_0$ and $u_7$, and so on until the binary versions of all of the moduli are combined.

The 27-bit wide binary number flowing though adder pipeline 159 will eventually produce a left-justified, 13-bit result. Mathematical theory can demonstrate that no more than three guard bits are needed for 13-bit precision in the four adds, so the arithmetic is performed with 16-bit adders.

ROM 147 of FIG. 11 performs an overflow-flag function. ROM 147 is a 5×19 ROM (which may alternatively be implemented using a PLA) that has a "1" bit wherever (($u_0 \cdot w_0$)÷M)+(($u_7 \cdot w_7$)÷M) is $\geq$M. ROM 147 is addressed by elements $u_0$ and $u_7$. If the output of ROM 147 is "1," the value (($u_0 \cdot w_0$)÷M)–M will be output from ROM 151, and if the output of ROM 147 is "0," the value ($u_0 \cdot w_0$)÷M will be output from ROM 151, without subtracting M. Thus, top adder 160 always outputs a sum less than M.

It is permissible to subtract the value M in the overflow case because only the remainders after division by M will be needed in the output. Factoring out the value of M as early as possible in the pipeline will not affect the output, therefore, and it has the significant advantage of reducing the sizes of the tables stored in ROMs 151–158 and adders in pipeline 159, which allows for a smaller circuit size.

The other inputs 141–146 similarly operate on input pairs of moduli using overflow ROMs 148, 149, and 150 and multiplying ROMs 152–158. Because of the use of overflow-flag ROMs 147–150, adder pipeline 159 will never generate a sum greater than 4M.

The binary number generated from adder 165 and stored in 30-bit register 166 consists of a 16-bit sum and a 16-bit saved carry. The following circuitry reduces numbers greater than M by subtracting 2M if the number is greater than 2M and then subtracting M if the number is greater than M. Because the output of adder chain 159 is less than 4M, that procedure will suffice to calculate the binary number, modulo M.

Carry-save subtracter 167 subtracts 2M from the value in register 166. Comparator multiplexer 168 computes the sign of the carry-save number. Comparator multiplexer 168 is essentially the final carry output of a conventional look-ahead adder that adds the 16-bit difference and the 16-bit carry-out of subtracter 167. The carries to all other stages but the most significant bit are not needed since only the sign bit is used, and the circuitry that produces them is not implemented, to reduce the size of the circuit. Multiplexer 168 chooses the output of subtracter 167 if the sign is positive, otherwise it chooses the input to subtracter 167, which is the same as the value in register 166.

The value chosen by multiplexer 168 is stored in a 32-bit register in 168. Subtracter 169 and comparator multiplexer 170 perform similar operations, but they subtract M rather than 2M. The output of 170 is a 16-bit sum and a 16-bit carry.

The sum and carry are added together in 172 to obtain a non-redundant, unsigned binary number. Next, subtracter 171 checks if the number from 172 is greater than M/2. If it is, subtracter 173 subtracts M to obtain the signed binary value, otherwise the number is unaltered. Binary subtracter 171 uses carry look-ahead but merely has to compute the carry to the most significant bit. The other carries produced by the carry-look-ahead circuitry are not needed and need not be implemented.

The width of the adders and registers need only be sufficient to determine the high-order 13 bits of the binary number, but they need sufficient low-order guard bits to prevent round-off error.

In the initial steps of the sequence implemented by FIG. 11, the 3- to 5-bit registers 139–146 and the 30-bit register 166 are placed in such locations as to limit the longest propagation delay to 30 nsec., to permit pipelining at that rate.

The residue-to-binary converter of FIG. 11 requires 2,565 bits for moduli ROMs 139–146 and overflow ROMs 147–150, another 128 bits of registers, 144 single-bit full adders, three 16-bit comparators, and two 16-bit carry look-ahead adder/subtracters.

The circuit also must be able to convert a signed binary number between –M/2 and M/2 to residue. For the resulting 13-bit binary number, 8192 rows would be needed in a simple table-lookup converter of the sort shown in FIG. 10. Instead, a more space-efficient implementation of a 13-bit binary-to-residue number converter is shown in block 193 of FIG. 12. Two binary-to-residue converters are used, six-bit converter 196 and seven-bit converter 195. Converter 196 converts the low six bits (lo) and converter 195 converts the high seven bits (hi) into residue numbers. Converters 195, 196 feed residue number adder 194. That is, the binary number is expressed as hi+lo, where hi is a multiple of $2^6$. If the binary number, and therefore hi, is negative, converter 195 outputs, and its ROM stores, the value (hi+M) rather than hi. The preferred implementation requires 64 and 128 rows, all of which are 32 bits wide, for a total of 6,144 bits of ROM. By contrast, the simple table-lookup converter of FIG. 9 would require 106,496 bits.

4. The DCT

The specification for a MPEG-2 main-level luma signal specifies a 720×480-pixel image, which represents a 90×60 array of (8×8-pixel) blocks, for a total of 5,400 blocks. The two chroma signals each require 1,350 blocks. (See Part 2.) Thus, 8,100 luma and chroma blocks must be transformed every thirtieth of a second to meet the specification, which means that a block must be transformed every 4.11 µsec.

The transform first operates on a row of eight points, where the output point (y) at any position (i,j) follows the formula:

$$y_{ij} = \sum_{k=0}^{7} x_{kj} \cdot C_{ki},$$

where $x_{kj}$ are the input parameters, expressed as frequencies, and $C_{ki}$ are a set of constants. The constants $C_{ki}$ have the values ±0.490393, ±0.461940, ±0.415735, ±0.353553, ±0.277785, ±0.191342, and ±0.097545, which are calculated according to the following procedure: If k=0, then $C_{ki}=1/(2\sqrt{2})$, else $C_{ki}=0.5\cdot\cos(k\cdot(2i+1)\cdot\pi/16)$. The arrangement of values of $C_{ki}$ are listed in FIG. 13.

Then, the transform operates on a column of eight points, where the output point z at any position (i,j) follows the formula:

$$z_{ij} = \sum_{k=0}^{7} y_{kj} \cdot C_{ik},$$

The below discussion demonstrates that the row transform can be completed by the inventive device in half of the time available to calculate a block, or 2.05 µsec. Because the column transform is essentially identical to the row transform, the entire process can therefore be performed in the available time.

Figure 12:
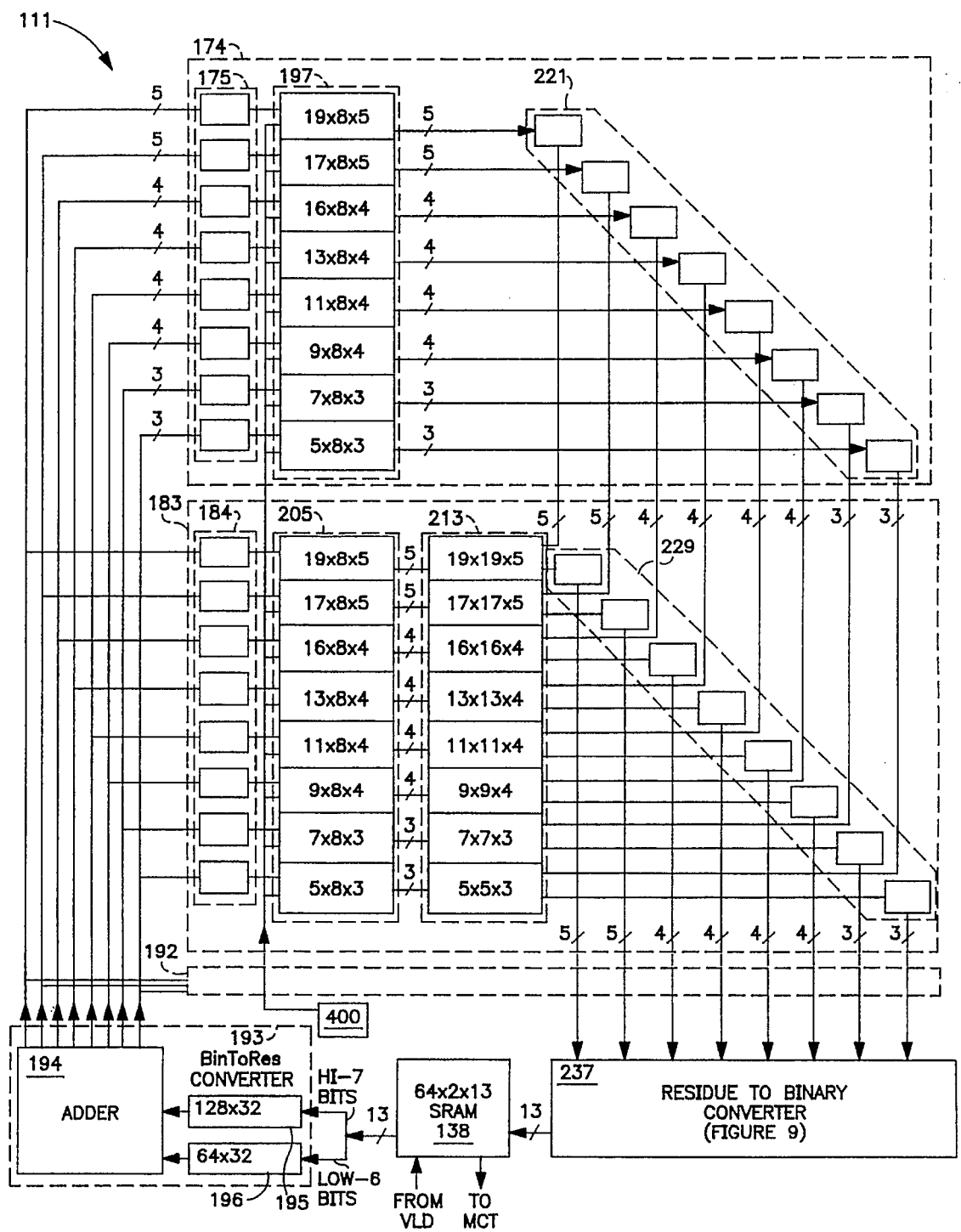
FIG. 12 is a block diagram illustrating a preferred embodiment of the video DCT module.

The DCT process is performed by the circuitry shown principally in FIG. 12. DCT module 111 of FIG. 12 (also shown as a block in FIG. 2) consists of eight "stages" (174, 183, 192, . . . ), which together make up a "pipeline" implementing the formulas above. Each stage includes an adder, a multiplier, and a set of registers (the first stage 174 can omit the adder). DCT module 111 also contains a binary-to-residue converter 193, as described above (or alternatively the simpler version of FIG. 9), and a residue-to-binary converter 237, described above in connection with FIGS. 10 and 11. Finally, DCT module 111 contains coefficient memory 138, which is shown in FIGS. 2 and 6 and is connected to MCT decoder 112.

The transform for each of the points $y_{ij}$ (the output of the first pass and input to the second pass) requires eight multiplications and seven additions. There are 64 such points. The operations to compute each point $y_{ij}$ are accomplished in eight steps, in the pipeline shown in FIG. 12.

Coefficient memory 138 is organized as two banks of SRAM, which are swapped sequentially every 4.11 µsec. FIG. 2 illustrate the case in which bank B is connected to the pipeline of DCT 111 (through binary-to-residue converter 193), while bank A communicates external to the DCT module. In FIG. 2, the results of the previous DCT operation are emptied from bank A of SRAM 138 into MCT decoder 112, and bank A is filled with new data from requantizer 110. There is time to both empty and fill memory 138 within the 4.11 µsec. allowed, because each entry can be read or written in 30 nsec., and there are 64 entries per block.

A preferred way of handling the data I/O (bank A in FIG. 2) is to read out one 9-bit value to MCT decoder 112, then write another 13-bit value from requantizer 110 in the same location, and repeat the cycle in a time-sliced manner. The sequence of locations can be set to match the scan sequence specified by FIGS. 7-1 and 7-2 of Part 2, namely zig-zag or alternate order. Because it does not matter how the data are outputted, the preferred method will output the data in the same order as the replacement data are inputted, in accordance with the specification. The preferred system reduces the number of SRAM bits required for memory 138.

Meanwhile, bank B of memory 138 feeds each row of data into binary-to-residue converter 193 (see FIG. 12), from where the data pass into the pipeline. Later, the sum of the row passes through residue-to-binary converter 237 (shown in FIG. 12 and detailed in FIG. 11), where it is converted to binary, after which it is rewritten into bank B of SRAM 138.

After the operations described above are completed, the connections of banks A and B are swapped, so that the just-transformed data in bank B can be passed to MCT 112 and that bank can be filled with new data from requantizer 110, while DCT 111 operates on new data in bank A.

Each stage of the pipeline (174, 183, 192, etc.) contains a multiplier having a set of ROMs that multiply an input value by a constant. The multiplier for the second stage (which is typical of all but the first stage) is 205. The input value is transferred from SRAM 138 through binary-to-residue converter 193 and stored in register set 184 for the second stage. The input value represents the value $x_{kj}$, as described in the formula above. The input value is multiplied by a constant $C_{ki}$, which is selected by reference to the step number. Counter 400 in FIG. 12 counts from 0 to 7 and generates the count as a step number. The step number is applied to the multiplier ROMs at each of the eight stages of the pipeline. The ROMs in multiplier 205 are written differently in each stage. For a stage k, the ROMs are written so that row number s has the residue-number representation of constant $C_{ki}$, where the value of i=(s–k)÷8.

The result is added to the output of the pipeline stage above it, using adder 213, which contains another set of ROMs. The cumulated sum is stored in a set of registers 229 and is used as an input to the stage below it. The ROM adders may be omitted in first stage 174, and the result of the multiplication (by multiplier 197) can be stored directly in registers 221. The output from the bottom stage (not shown) is passed directly to residue-to-binary converter 237.

In operation, in each time step, an element $x_{kj}$ is put into the input registers for one of the stages. As a partial result is shifted from top stage 174 to the bottom stage, the registers in the pipeline accumulate the products $x_{kj} \cdot C_{ki}$. At the end of the sequence, the sum passed to residue-to-binary converter 237 is the output $y_{ij}$.

To visualize this pipelined operation, consider stages as rows and time steps as columns. Using that protocol, the movement of partial results through the circuit over time is illustrated in FIG. 14. Computing a first-stage output value for $y_{ij}$ according to the above formula proceeds along a diagonal line through the array of FIG. 14. That is, during the eight time steps 0–7 (numbered across the top of FIG. 14), the output value is cumulated through each of the stages of the circuit (numbered down the left side of FIG. 14) in sequence. (In FIG. 14, the expression "+=" refers to the C-language operator that adds the right side to the left side, replacing the left side with the sum.)

Note that, as seen in FIG. 14, the value $x_{00}$ is put in registers 175 (for the first stage) in time step zero, as $y_{00}$ begins to be computed, and remains in that register for time steps one through seven, after which $y_{00}$ is fully computed. In time step one, $x_{10}$ is put in registers 184, as $y_{00}$ passes the second stage, and remains there for time steps one to eight. In time step two, $x_{20}$ is put in the next lower registers, as $y_{00}$ passes the third stage, and remains there for steps two through nine, and so on. After the eighth step, the last shown in FIG. 14, the process is repeated. Thus, the calculation of $y_{00}$ is completed after the ninth step, $y_{20}$ is completed after the tenth step, and so forth.

The coefficients $C_{kj}$ used in this calculation are multiplied using multipliers 197, 205, etc. Those multipliers' ROMs can be made smaller than would be required for general multipliers, as only multiplication by one of eight constants is performed, as discussed above. Specifically, only eight constants need be stored in each set of multiplier ROMs, rather than fourteen constants, because the algorithm cycles through eight steps, each of which uses only one constant. Another way of looking at this same result is to note, from FIG. 14, that the nth stage of the pipeline uses as multipliers only the nth row of FIG. 13. So, the step number is sent to each pipeline stage, to select the multiplier to be used in that stage, for that step. The dimensions of the ROMs in multiplier 197 are 5×8, 7×8, 9×8, 11×8, 13×8, 16×8, 17×8, and 19×8, respectively, where the second dimension is fixed by the step count.

This apparently wasteful process actually requires $n^2$ operations rather than $n \cdot \log_2(n)$ operations, as noted above. Nonetheless, the process is advantageous because it uses a uniform, simple operation at each stage of the pipeline shown in FIG. 12. That factor allows for reduced chip area, because the operations needed can be performed in sequence by common circuitry.

If the 64 outputs $y_{ij}$ are to come out of the pipeline in 2.05 μsec., each output must come out every 32 μsec. The carry look-ahead comparators and look-ahead adder/subtracters within residue-to-binary converter 237 (that is, elements 168 and 170–173 of FIG. 11) must each execute in a 32 nsec. pipeline step time. The table-lookup addition and multiplication, and conversion to and from residue, executed in such a pipeline step, each have to complete the operation in each stage in 32 nsec. Consequently, 15-nsec. ROMs and SRAMs are indicated. Integrated circuits now in production can achieve such speeds.

Alternatively, a conventional four-bit binary adder can implement the modulus-16 adder in the 16×16×4 ROM in adder 213, and an Agrawal-Rao adder can implement the moduli-9 and -17 adders in adder 213. Also, combinational logic gates or PLAs can be used to implement the adders. Such fine-tuning, using special circuits, may possibly reduce the size of the adders further than the better-known table-lookup adders. The Agrawal-Rao adder is described in Agrawal et al., "Modulo [$2^n$+1] Arithmetic Logic," pages 186–88 of the IEEE Journal on Electronic Circuits & Systems (Vol. 2, Nov. 1978), which is reprinted in Soderstrand et al., Residue Number System Arithmetic: Applications in Digital Signal Processing, pp. 123–25 (IEEE Press 1986), and is hereby incorporated by reference.

Also, several of the stages do not need all eight multipliers, so the ROMs for those stages can be reduced in size. Nevertheless, the system is described herein, and circuit area is calculated, without such special adder circuits and using worst-case multiplier implementations.

Although FIG. 12 suggests for clarity that the elements of each pipeline stage are near each other, in fact it would be preferable to reduce interconnect size by handling each residue digit in a separate part of the chip. That approach will allow a series of smaller buses to feed each digit, rather than a single-wide bus that must extend to all stages.

To calculate the total component count, note that DCT module 111 consists of seven stages that include an adder, a multiplier, and 64 bits of register, and one stage (first stage 174) that uses a multiplier and 64 bits of register. DCT module 111 also uses a binary-to-residue converter 193, which contains a residue adder and an additional 6,114 bits of ROM. In all, there are eight residue adders, eight multipliers, and eight register sets. Using the calculation methods explained in connection with FIG. 8, an adder for the 8-moduli system described above uses 5,980 bits of ROM, and a multiplier uses 3,296 bits of ROM. Thus, the eight-stage "pipeline" and binary-to-residue converter 193 together use 80,352 bits of ROM and 512 bits of register.

The circuit requirements for residue-to-binary converter 237 of DCT module 111 are noted above in connection with FIG. 11. In all, DCT module 111 in FIG. 12 uses 80K bits of ROM, 740 bits of registers, 144 single-bit full adders, three 16-bit comparators, two 16-bit carry look-ahead adder/subtracters and 1.6K bits of 15-nsec. SRAM. DCT is thus dominated by ROM and is comparable in chip area to an 80 Kbit ROM.

A similar pipeline that used binary numbers rather than residue numbers would use ROMs to implement multiplication by a constant, in a manner analogous to the residue multiplication technique, and a carry-save adder to add the products. If the products of the input $x_{kj}$ times seven coefficients $C_{kj}$ are stored in a ROM in each of the stages, then the adder can compute the sum according to the formula above. However, because the eight stages of the DCT pipeline for the binary multiplier would each require a 7×8,192×13-bit ROM to implement multiplication by a constant, the total ROM required would be about 6 Mbits, two orders of magnitude larger than the residue-number pipeline. Therefore, the use of residue-number pipeline provides significant space savings as compared to a binary-number pipeline.

The residue number system requires a carry-save adder (CSA) to convert from residue to binary. The binary number system also requires a CSA, for a different purpose, to execute multiplication quickly. The residue number system, however, has only eight stages of CSAs. In a binary system's multiplier pipeline, 12 stages of CSA would be needed to multiply a 12-bit number by a constant. In addition, the conversions between residue and binary occur only before and after the transform, rather than during each multiplication. Therefore, the CSA in the residue system can operate more slowly than the CSA in a binary system, or fewer CSAs would be needed to achieve a desired speed.

The residue number system can be implemented in a regular structure, providing better layout, which provides an additional advantage over the binary system.

5. System Considerations

MPEG's main compression mechanism is motion compensation. The block that is output from DCT 111 is stored in SRAM 138 (see FIG. 12). The Motion Compensation Transformation module (MCT 112) generally adds this block to a block stored in buffer 113 (see FIG. 2) to produce a block of 8×8 pixels that are displayed on the screen 104 and stored in buffer 113 for future updates. Because MCT 112 often uses a block saved in the buffer 113 that is similar to the block being displayed, the difference between the stored block and the output block is often small and may even be zero, so much less data need be sent over channel 103. This contributes significantly to video compression.

A description of the MCT module and its operation is described in §7.6 of Part 2 in sufficient detail that one skilled in the art can implement a suitable module to complete the MPEG-2 video decoder.

In one embodiment of the video decoder, DRAM 108, 113, 117, and 118 (see FIG. 2) can all be located on a single external DRAM chip or subsystem. Alternatively, those storage elements can be integrated on the same chip as the MPEG decoder, so that all of the modules shown in FIG. 2 would comprise part of a single decoder circuit 104. The first embodiment uses SRAM on decoder chip 104 to hold data from buffer 113 that is added to the block in SRAM 138 or that is being modified and will be written into buffer 113, essentially in a manner that a microcomputer uses cache memory. The second embodiment can construct on-chip storage elements 108, 113, 117, and 118 using multiple banks, so that there are buses with enough bandwidth to transfer data to and from MCT 112 and to video output 104. Use of such multiple banks eliminates the need for cache-like SRAM to hold data currently being used.

The audio decoder must parse the input stream, requantize the frequency components 115, convert them to time samples using a discrete cosine transform, and smooth out the time samples using a windowing operation 116. The audio decoder is described in Part 3 and the Audio Standard in sufficient detail that one skilled in the art can implement a suitable module to complete the MPEG-2 audio decoder. Parsing the audio stream can be accomplished in VLD 109. Audio requantizer 115 and audio DCT-windowing circuit 116 produce audio output 106. Those circuits are preferably implemented using a conventional digital signal processor (DSP).

System controller 114 and parser 107 are implemented as conditional move (MOVE) processors, which contains a combination of vertical microprogramming, a small microcontroller (e.g., the Motorola 6809), addressing, and memory-mapped I/O. MOVE processors are described in more detail in Tabak and Lipovski, "MOVE Architecture in Digital Controllers," published at pages 180–89 of the IEEE Transactions on Computers (Vol. C-29, No. 2, February 1980), which is hereby incorporated by reference.

Figure 15:
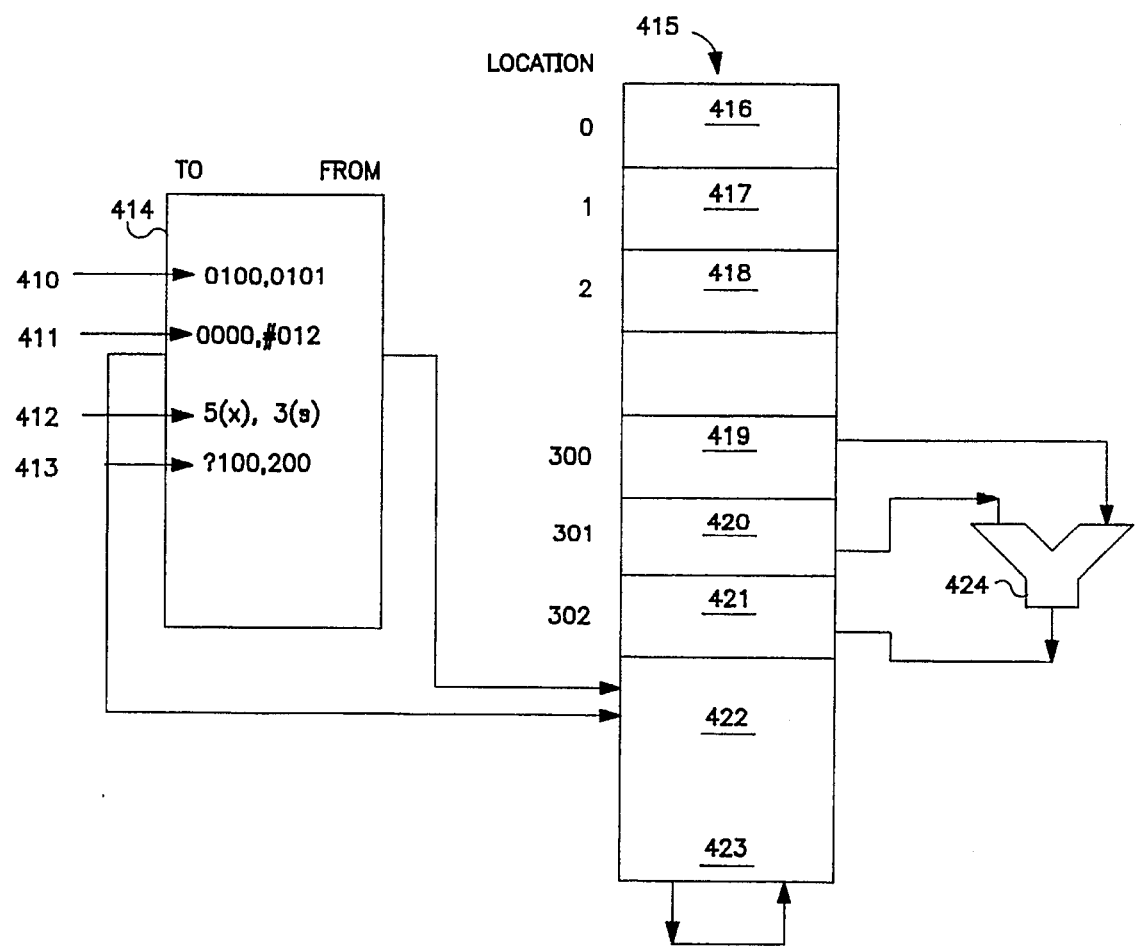
FIG. 15 is a functional diagram of a MOVE processor of the type used for system control in the preferred embodiment.

The general structure of a MOVE processor is illustrated in more detail in FIG. 15. Each instruction stored in program memory 414 contains a from-address (on the right) and a to-address (on the left) for movement of a word in data memory 415.

The from-address can be a direct address, as indicated in the from addresses of instruction 410, which gives an exact location in data memory 415. The from-address can also be an immediate value, that is, a constant, as indicated in the from-address of instruction 411. Finally, the from-address can be an index address, which instructs the system to use the address in the index register s (or register x), as indicated in the from-address of instruction 412.

The to-address can be direct, as shown in instruction 410. The to-address can also be indexed to a register, as shown by the to-address of instruction 412. Finally, the to-address can be conditional, as shown by the to-address of instruction 413. A conditional address is direct, but the word is stored in the destination only if the previous non-conditionally moved data value was positive.

The examples shown in FIG. 15 illustrate the various types of addressing: Instruction 410 (0100,0101) moves a word from location 0101 to location 0100. Instruction 411 (0000,#012) puts the constant 12 into location 0000. If index register x contains the value 0200 and register s contains the value 0400, instruction 412 ((5(x),3(s)) moves the word at location 0403 to location 0205. Finally, instruction 413 (7100,200) moves the word at location 200 to location 100 if the last word that was not conditionally moved was positive.

Control and arithmetic registers are memory mapped. For instance, the program counter may be at location 0 (block 416 in FIG. 15), in which case a jump to location 52 would be accomplished by the move (0,#52). But if the program counter is not moved directly, it is automatically incremented. Similarly, the index registers x and s appear as locations 1 and 2 in the data memory (blocks 417 and 418). Finally, if an adder is needed (it may be unnecessary for the inventive MPEG decoder), then three memory words (e.g., blocks 419, 420, and 421) might be connected to serve as ports for adder 424, using locations 300 and 301 for its inputs and 302 for its output. In that case, to add location 10 to location 11 and place the sum in location 11, the control program (300,10), (301,11), (11,302) would be run.

The MOVE processor described above can be used to control input to buffer 108 and to take data out of buffer 108 to the video or the audio decoder. The input MOVE processor 107 of FIG. 2 is described first, then the MOVE processor controlling the video and audio decoders (controller 114 of FIG. 2) is described next.

The transport or program streams (see Part 1) are converted to elementary compression-layer streams before being stored in buffer 108. Translation is straightforward since packets and packs have fixed lengths. However, the transport or program streams may require user programming to handle conditional access tables and private streams, and transport streams require error checking.

A system parser 107 writes data into buffer 108. It is implemented as a small MOVE processor that uses a fixed-length field-extraction decoder (FLD) similar to FLD 119 of FIG. 5 to parse the transport or program stream. A shift register (see Annex B of Part 1) CRC-checks packets for transport stream errors. The input's FLD, CRC check and the 108 buffer's input port are contained in the data memory of the MOVE processor of parser 107.

For the SNR scalability profile (see Part 2), two video decoder inputs are used as buffers for two simple compression-layer streams (see Part 1). The two streams together require 1.835 Mbits of buffer storage 108 (see §8.3.3.2 of Part 2), in DRAM. The DRAM that may be outside the MPEG decoder chip or on the same chip as the decoder logic.

If buffer 108 is off-chip, decoder 104 can buffer the two outputs to DRAM and the two inputs from DRAM with double-buffered SRAM. VLD 109 has a shift register inside it. Each SRAM buffer can be 64 bytes, conforming to the MCT block size. The shift registers generally have 30 nsec. to shift any number of bits up to 16, or to shift 32 bits as a unit. If the shift register is able to shift one bit, four bits, or sixteen bits in one clock cycle, and a 5-nsec. clock is used, then any new pattern can be shifted in 30 nsec.

Controller 114 is implemented as a second MOVE processor. That processor uses a timer to synchronize the decoding of audio and video packets by controlling the token bus at the bottom of 108. That timer, a small amount of storage, and certain input and output ports are contained in the data memory of the second MOVE processor. The program of controller 114 is specified in §6 of Part 2. The MOVE processor will require a ROM that can store about 2,000 12-bit words.

MOVE processor 114 operates to parse the elementary video stream, sending values to video requantizer 110, and to parse the elementary audio stream, sending values to audio processor 115–116. MOVE processor 114 also controls bus 399 of FIG. 5 and the distribution of data to and from requantizers 110 and 115.

To decode a worst-case block in fixed time, either of the two inputs to video requantizer 110 should be available when requantizer 110 needs a token. Thus, VLD 109, token bus 399, and requantizer 110 should process one DCT coefficient token in 15 nsec. That is easy to do in VLD 109. Requantizer 110, which is a multiplier with three six-bit inputs, can be built for that speed, in pipelined fashion if necessary.

However, long times will elapse when no token is needed. Thus, controller 107 should be multi-threaded, having four separate microprogram counters, such that any one of them can cause their step to be taken during any microcycle. Concurrent multi-threaded decoding avoids the need for extra buffers in the processors to synchronize the outputs because the controller, knowing how long each processor takes, can obtain tokens from the input streams and feed inputs to the video and video processors at times that will cause the outputs to occur at the desired times.

The two video streams feeding video data to requantizer 110 each use a thread with separate microprogram counters. These video stream threads compete round-robin when they both need to move data to the requantizer. When either of the two video requantizer inputs doesn't need a token, other microinstruction streams (using their microprogram counters) will be able to parse other parts of the stream. When that occurs, the audio can obtain a token, and if no audio token is needed, a preprocessing parse can be executed.

The preprocessing parse is needed to locate video, audio, or system frame headers in the input stream so that the other parsers can later operate concurrently on demand. The preprocessing parse runs through the input stream, moving past tokens but not sending the tokens anywhere, and keeping track of the location of headers in the input buffer. Once the several headers are located, the other threads can be independently executed.

All such registers should be double-buffered, to allow a thread to load a stream variable into a register before it is needed by the thread that the stream variable controls. When the thread being controlled is ready to use the new set of stream variables, the preloaded values are transferred from the input register to the output register or the double buffer register.

Double-buffer SRAMs are needed for each of the inputs to input buffer 108. Each of the outputs from input buffer 108 to VLD 109 require an SRAM buffer, one for each of the video channels, one for the audio, and one for the preprocessor. The four buffers for the outputs have shift registers. Thus, six double-buffers, implemented in 6K bits of SRAM, are used in the MPEG decoder chip in connection with input buffer 108.

MPEG decoders have acquired a reputation of being difficult to test. The inventive implementation should be easier to test. Most of the decoder consists of tables, which can be tested by reading out their rows. Registers on the inputs and outputs of the ROMs can be boundary-scan registers. Where a multiplier ROM feeds into an adder ROM without a register in between, the multiplier should have a multiplication of 1 (which can be implemented with a switch that bypasses the multiplier ROM), so that the adder ROM can be addressed and thus read out.

The carry-save adders 167–173 in residue-to-binary converter 237 and requantizer 110 are the only substantial circuits that require testing. The adders are generally easily testable because faults tend to propagate to the output through exclusive-OR gates that render the faults observable, so a few simple tests can detect the presence of a large number of faults.

Although the invention has been described with reference to specific embodiments, many modifications and variations of such embodiments can be made without departing from the innovative concepts disclosed.

Thus, it is understood by those skilled in the art that alternative forms and embodiments of the invention can be devised without departing from its spirit and scope. The foregoing and all other such modifications and variations are intended to be included within the spirit and scope of the appended claims.

I claim:

1. A discrete cosine transform module for an integrated circuit for performing video decoding comprising:

(a) a binary-to-residue converter having an output;

(b) a residue-to-binary converter having an input; and (c) a plurality of multipliers configured to represent a plurality of stages of a pipeline, each multiplier having an input and an output;

(d) wherein the inputs of the multipliers are coupled to the output of the binary-to-residue converter and the outputs of the multipliers are coupled to a residue-to-binary converter.

2. The apparatus of claim 1:

(a) further comprising aplurality of adders, one associated with each of the multipliers except one, each adder having two inputs and an output;

(b) wherein the inputs of a first of the adders are coupled to the outputs of two of the multipliers, wherein one of the inputs of each of the other adders is coupled to the output of another of the adders, and wherein the other input of each of the other adders is coupled to one of the multipliers; and (c) wherein the output of one of the adders is coupled to the input of the residue-to-binary converter.

3. The apparatus of claim 2 wherein the multipliers are implemented as a set of ROMs, one of which is associated with each member of a set of moduli.

4. The apparatus of claim 3 wherein each ROM is structured to multiply an input number by one of a set of constants.

5. The apparatus of claim 3 wherein the moduli are the set of numbers (5, 7, 9, 11, 13, 16, 17, and 19).

6. The apparatus of claim 1 wherein the residue-to-binary converter comprises an adder tree having an input and an output and a plurality of multiplier ROMS coupled to the input to the adder tree.

7. The apparatus of claim 6 wherein the residue-to-binary converter further comprises another plurality of ROMs coupled to perform an overflow-flag function.

8. The apparatus of claim 6 wherein the residue-to-binary converter further comprises a sequence of carry-save subtracters coupled to the output of the adder tree and structured to cause the converter to output a binary number that is equal to the output of the adder tree modulus M, where M is the product of the residue moduli.

9. The apparatus of claim 4 wherein the residue-to-binary converter comprises:

(a) an adder tree having an input and an output;

(b) a plurality of multiplier ROMs coupled to the input to the adder tree; and (c) a sequence of carry-save subtracters coupled to the output of the adder tree and structured to cause the converter to output a binary number that is equal to the output of the adder tree modulus M, where M is the product of the residue moduli.

10. A discrete cosine transform module for an integrated circuit for performing video decoding comprising:

(a) means for converting binary numbers to residue numbers;

(b) means, coupled to the binary-to-residue converting means, for multiplying the residue numbers converted by the means in part (a) by a set of discrete cosine transform constants;

(c) means, coupled to the multiplying means, for summing a plurality of the multiplied residue numbers; and (d) means, coupled to the summing means, for converting the summed residue number to binary.

11. The apparatus of claim 10 wherein the multiplying and summing means are arranged in a multi-stage pipeline.

12. The apparatus of claim 10 wherein the residue-to-binary converting means comprises:

(a) means for multiplying residue elements of a residue number by weights for each of the residue moduli;

(b) means, coupled to the multiplying means, for adding a plurality of multiplied numbers; and (c) means for creating a binary number that is equal to the output of the adding means modulus M, where M is the product of the residue moduli.

13. A method of performing a discrete cosine transform for video decoding in a module of an integrated circuit comprising:

(a) receiving at the module a sequence of binary numbers representing discrete cosine transform input variables derived from differences between two sets of image data;

(b) converting the binary numbers to residue numbers;

(c) multiplying each of the resulting residue numbers by a member of a subset of discrete cosine transform constants;

(d) summing the resulting residue products;

(e) converting the summed residue number to binary;

(f) repeating (b) through (e) a plurality of times, each time using a different subset of discrete cosine transform constants; and (g) outputting from the module the converted binary numbers, which numbers represent differences between two sets of image data.

14. The method of claim 13 wherein the multiplying and summing is performed in a multi-stage pipeline of a decoder circuit.

15. The method of claim 14 wherein the act of converting the summed residue number to binary comprises:

(a) multiplying residue elements of the summed residue number by weights for each of the residue moduli;

(b) adding the resulting plurality of multiplied numbers; and (c) creating a binary number that is equal to the resulting sum modulus M, where M is the product of the residue moduli.

16. The method of claim 15 wherein the residue moduli are the set of numbers (5, 7, 9, 11, 13, 16, 17, and 19).

17. A variable-length decoder for an integrated circuit for performing video decoding comprising:

(a) an input buffer;

(b) a shift register coupled to the input buffer;

(c) a fixed-length-field extraction module;

(d) at least one variable-length module comprising a PLA containing a compare column, a data output column, and a shift column;

(e) a bus coupling the shift register and the modules;

(f) wherein the shift column of the PLA is coupled to the shift register so as to cause the shifting of data in the shift register a number of locations defined by data in the shift column; and (g) wherein, when data in the shift register matches data in the compare column of a selected row of the PLA, data at the intersection of the shift column and the selected row are applied to the shift register and data at the intersection of the data output column and the selected row are placed on the bus.

18. The apparatus of claim 17 wherein the variable-length module comprises a plurality of PLAs, each having a source address, and wherein the bus is further coupled to a plurality of registers, each having a destination address.

19. The apparatus of claim 18 further comprising a MOVE processor containing data defining a sequence of source addresses and destination addresses in accordance with the MPEG-2 specification.

20. A variable-length decoder for an integrated circuit for performing video decoding comprising:

(a) means for extracting a fixed-length-field from input data;

(b) at least one variable-length module comprising a PLA containing a compare column, a data output column, and a shift column;

(c) means for shifting input data a selected number of locations;

(d) means for comparing variable-length input data with data in the compare column of a selected row of the PLA; and (e) means, coupled to the comparing means, for, upon recognizing a match in the selected row, (i) causing the shifting of input data a number of locations defined by data at the intersection of the shift column and the selected row, and (ii) causing the decoder to output data at the intersection of the data output column and the selected row.

21. The apparatus of claim 1 wherein the set of discrete cosine transform constants are the set of constants for the eight-point discrete cosine transform.

* * * * *

UNITED STATES PATENT AND TRADEMARK OFFICE
CERTIFICATE OF CORRECTION

PATENT NO. : 5,623,423
DATED : April 22, 1997
INVENTOR(S) : G. Jack Lipovski

It is certified that error appears in the above-indentified patent and that said Letters Patent is hereby corrected as shown below:

Change Claim 1 to:

--1. A discrete cosine transform module for an integrated circuit for performing video decoding comprising:
    (a) a binary-to-residue converter having an output;
    (b) a residue-to-binary converter having an input;
    (c) a plurality of multipliers, each multiplier having two inputs and an output;
    (d) wherein a first of the inputs of each of the multipliers is coupled to the output of the binary-to-residue converter and wherein the second of the inputs of each of the multipliers are together associated with a set of discrete cosine transform constants; and
    (e) a plurality of adders, each having two inputs and one output;
    (f) wherein some of the inputs of the adders are coupled to the outputs of the multipliers and wherein the rest of the inputs of the adders are coupled to the outputs of the other adders; and
    (g) wherein the output of one adder is coupled to the input of the residue-to-binary converter.--

Change Claim 2 to:

--2. The apparatus of claim 1 further comprising a set of registers coupled to an input of each of the adders.--

Change Claim 3 to:

--3. The apparatus of claim 1 wherein the multipliers are each implemented as a set of ROMs, one of which is associated with each member of a set of moduli.--

UNITED STATES PATENT AND TRADEMARK OFFICE
CERTIFICATE OF CORRECTION

PATENT NO. : 5,623,423
DATED : April 22, 1997
INVENTOR(S) : G. Jack Lipovski

It is certified that error appears in the above-indentified patent and that said Letters Patent is hereby corrected as shown below:

Change Claim 4 to:
--4. The apparatus of claim 3 wherein the second input of each multiplier is coupled to a step-number counter, and wherein each set of ROMs is structured to multiply a variable on the first input by a member of a set of constants selected by the step number.--

In claim 6, line 3, change "ROMS" to --ROMs--

Signed and Sealed this

Fourth Day of November, 1997

*Attest:*

BRUCE LEHMAN

*Attesting Officer*  Commissioner of Patents and Trademarks

UNITED STATES PATENT AND TRADEMARK OFFICE
CERTIFICATE OF CORRECTION

PATENT NO.  : 5,623,423
DATED       : April 22, 1997
INVENTOR(S) : G. Jack Lipovski It is certified that error appears in the above-identified patent and that said Letters Patent is hereby corrected as shown below:

Title page, item [73], Assignee:   should read--Linden Technology Limited, Austin, Texas--.

Signed and Sealed this

Tenth Day of February, 1998

Attest:

BRUCE LEHMAN

Attesting Officer

Commissioner of Patents and Trademarks